US005097272A

United States Patent [19]

Tsumura et al.

[11] Patent Number: 5,097,272

[45] Date of Patent: Mar. 17, 1992

[54] THERMAL HEAD, PRODUCING METHOD THEREFOR, AND RECORDING APPARATUS USING THE THERMAL HEAD

[75] Inventors: Makoto Tsumura; Yasuaki Suzuki, both of Hitachi; Tatuo Honda; Yasuro Hori, both of Katsuta; Ren Itoh, Hitachi, all of Japan

[73] Assignees: Hitachi, Ltd.; Hitachi Koki Co., Ltd., both of Tokyo, Japan

[21] Appl. No.: 489,483

[22] Filed: Mar. 6, 1990

[30] Foreign Application Priority Data

Mar. 17, 1989 [JP] Japan .................................. 1-63692

[51] Int. Cl.[5] ...................... G01D 15/10; G01D 15/16; B41J 2/335

[52] U.S. Cl. ............................................. 346/76 PH

[58] Field of Search .................................... 346/76 PH

[56] References Cited

FOREIGN PATENT DOCUMENTS

| | | | |
|---|---|---|---|
| 55-26983 | 7/1980 | Japan . | |
| 0058877 | 4/1985 | Japan | 346/76 PH |
| 0034158 | 2/1988 | Japan | 346/76 PH |
| 63-73395 | 10/1989 | Japan . | |

*Primary Examiner*—Benjamin R. Fuller
*Assistant Examiner*—Huan Tran
*Attorney, Agent, or Firm*—Kenyon & Kenyon

[57] ABSTRACT

A thermal head serves as a recording head used in a thermal recording apparatus for performing a recording with heat produced by an electric current flowing into a thick-film resistor. Regions having higher resistance than that of the thick-film resistor are disposed in the thick-film resistor and heating portions each corresponding to one dot in the thick-film resistor are controlled by electric current flowing therethrough from one of first electrodes to one of second electrodes provided in the thick-film resistor. A heating control method for such thermal head attains superfine recording and halftone recording and a method produces such a head and a recording apparatus using the head.

26 Claims, 16 Drawing Sheets

18

17

18

40

THERMAL HEAD, PRODUCING METHOD THEREFOR, AND RECORDING APPARATUS USING THE THERMAL HEAD

BACKGROUND OF THE INVENTION

1. Field of the Invention

The present invention generally relates to recording heads in a thermal recording apparatus, and particularly relates to a thermal head suitable for superfine and halftone recording with high-accurate heating control, a driving method for a circuit for driving the head, a method for producing the head, and a recording apparatus using the head and the methods.

2. Description of Related Art

The system configuration and operation of a recording apparatus using a thermal head ar described with reference to an example shown in FIGS. 22 and 23. FIG. 22 shows the system configuration of the recording apparatus. The recording apparatus comprises an image source 24, a signal control portion 26, a thermal head 28, a micro-processing unit (MPU) 25, a mechanism control portion 27 and a mechanism portion 29. The control is as follows. Image information stored in the image source 24 is converted into a binary signal, corresponding to the recording characteristic of the head by the signal control portion 26, that includes line by line of dots, on the basis of a control signal produced from the MIP 25, and the binary signal is transferred to the thermal head 28.

On the other hand, the mechanism portion operates with the aforementioned control as follows. An ink sheet 31 and a sheet of image receiving paper 33 are nipped between a heating resistor of the thermal head 28 and a paper feeding platen roller 34. The thermal head 28 is heated in accordance with the binary signal transferred thereto, so that a one-line image is formed on the image receiving paper 33. Thereafter, take-up rollers 30 and 32 for taking up the ink sheet 31 and the receiving paper 33 rotate in synchronism with the rotation of the platen roller 34. Thus, printing image on one sheet is completed by repeating the aforementioned operation. In the case where the recorded image is a halftone picture expressing light and shade, an ink sheet, such as thermal sublimation type ink sheet or thermal paper, having halftone properties with respect to heat is used.

The halftone recording method is classified into three types as follows.

(1) A density tone stepping method in which the dots are recorded with variety in density by changing the pulse width of the binary signal corresponding to the image information.

(2) A density patterning method in which each picture element is constituted by a plurality of recording dots and the density is adjusted through changing the number of dots to be recorded in each picture element.

(3) Dither Method

One kind of the density patterning method in which N×M kinds of binary (for example, white and black) patterns in an N×M dot matrix are provided preliminarily and one of the patterns is selected correspondingly to the density.

To record a superfine, high-quality halftone image by using any of these recording methods, it is necessary to make the pitch of arrangement of the heating resistors of the thermal head 28 finer to thereby improve resolution (the number of recording dots per unit length) or to use a thermal head 28 having halftone recording characteristic or capability of changing the area (heating area) of the recording dot.

In general, the thermal head acting as described above comprises a conductor electrode formed on an insulating substrate, a plurality of heating resistors disposed thereon, and a driving circuit including driving elements for selectively supplying currents to the heating resistors to selectively heat the resistors. One of the techniques for producing such a thermal head by a thick-film process has been described in Japanese Patent Post-examin. Publication No. 55-26983. According to the technique, comb-like common electrodes and signal electrodes (called "individual electrodes" in the sense that individual signals are applied) are arranged on an insulating substrate; paste of a resistance material containing ruthenium oxide ($RuO_2$) is provided in the form of a belt thereon by a screen printing technique. The electrodes are formed with high accuracy by applying an etching technique to a conductor layer. On the other hand, the resistor layer is formed easily by printing by using a pattern printing apparatus. Accordingly, the thick-film process has an advantage in that equipment cost is low and, accordingly, manufacturing cost for the head portion is low.

FIGS. 24 and 25 show an example of the thermal head and the circuit for driving the head.

In FIG. 24, common electrodes 2 connected to an electric power source 3 and signal electrodes 4 connected to output terminals of driving elements $Q_n$ (n=1, 2, 3 . . . ) of the driving circuit 6 are formed on an insulating substrate (not shown), for example, by a vapor deposition process and an etching process; and the belt-like resistor 1 is laminated thereon by a printing process. When one output terminal, for example, $Q_1$, of a driving element in the driving circuit 6 is turned ON, currents *7a* and *7b* flow from the power source 3 to a signal electrode 4 and the output terminal $Q_1$ through the common electrodes 2 and the heating resistors *5a* and *5b*. At this time, the heating resistors *5a* and *5b* are heated to color a thermal paper at portions in contact with the heating resistors or transfer ink of an ink sheet onto receiving paper. That is, a recording dot is formed.

However, the aforementioned thermal head is designed to heat two heating resistors by one signal electrode. In short, one picture element is recorded by heating two heating resistors, so that the area of the heating portion is doubled. Accordingly, it is difficult to improve picture resolution.

To improve the resolution, a method of dividing the common electrodes into two groups and connecting the groups of common electrodes respectively to electric power sources *3a* and *3b* as shown in FIG. 25 has been used to double the resolution by twice. The apparatus operates as follows.

The electric power sources *3b* and *3a* are set to be in an electrically open state (high impedance state "Z") and a state of voltage $V_H$, respectively. In the case where the driving elements $Q_1$ and $Q_2$ in the driving circuit 6 are in ON state, the current *7a* flows into the heating resistor *5a* but no current flows into the heating resistor *5b* because the output terminals $Q_1$ and $Q_2$ have the same potential. However, when the output $Q_2$ is turned OFF, the stray current *7c* is one third as much as the current *7a* because resistance in the current path is increased by three times compared with that of the current path for the current *7a*.

In the case of binary image recording, the boundary between the binary values indicating the recording density to be printed is about half the maximum value thereof, so that the printing is not affected by the stray current.

Half the number of dots in one line are first recorded by the aforementioned operation. Then, the voltages of the electric power sources *3a* and *3b* are switched over so that the electric power sources *3b* and *3a* are set to $V_H$ and "Z", respectively. As described above, the output terminals of the driving elements $Q_n$ of the driving circuit 6 are operated corresponding to the binary image signal, to thereby record the remaining half of the dots. Thus, recording of all dots on one line is completed.

The aforementioned conventional apparatus has the following problems.

(1) In the case where resistors having a large difference in the resistance value between adjacent heating resistors, in particular, thick-film resistors, are used, it is difficult to improve resolution.

(2) Because two heating resistors disposed between the individual electrode and the common electrode are simultaneously energized and heated by the output of one driving element, it is difficult to correct the difference in heating characteristic caused by the variations in the resistance value of the heating resistors.

(3) Although it is possible to increase resolution by twice as described above, undesired currents flow through heating resistors which should be not heated. Accordingly, not only is it difficult to have high-accurate heating control but there is also a loss through a large consumption of electric power.

(4) All dots (all heating resistors) in the thermal head cannot be operated at one time. Accordingly, it is disadvantageous in recording speed compared with a thermal head capable of operating all dots at a time.

SUMMARY OF THE INVENTION

The present invention seeks to solve these problems and to provide a thermal head capable of performing superfine recording as well as halftone recording.

The present invention provides a thermal head in which the one-dot area of its heating resistance occupied by one dot is reduced and all the one-dot areas can be heated independently.

The present invention also provides a driving method of a circuit for driving the head, a method of producing the head and a recording apparatus using the head.

The present invention can achieve these solutions by the following embodiment.

(1) A belt-like resistor formed on an insulating substrate is divided widthwise into a plurality of resistor portions separated by a plurality of highly resistive regions having a resistance value relatively higher than that of the resistor, so that the heating resistor portions are respectively disposed between the highly resistive regions. A plurality of common electrodes extend to cross the heating resistor, portions, respectively, in the direction of the width thereof and a plurality of signal electrodes are in contact with the heating resistor portions. Further at least one of the two kinds of electrodes is in contact with the highly resistive region.

(2) In addition to the first embodiment, a part of the heating resistor portion between the two electrodes is formed so that the current density is concentrated, because portions where electrodes are overlapped with resistors have a small value of current density.

(3) In addition to the first embodiment, the width and sheet resistance of the highly resistive region are set to prevent current leakage (cross-talk) between the highly resistive region and the part of the heating resistor portion between the two electrodes, according to the ratio of the resistance value of the highly resistive region to electric power applied to the part of the heating resistor portion.

(4) Recording picture element portions are formed by the respective parts of the heating resistor portions, each between the common electrode and one of the plurality of signal electrodes and the control signals are applied to the signal electrodes at different timings.

(5) A producing process having an electrode forming step, a heating resistor forming step and a heating resistor portion separating step is used when the thermal head body is structured on the insulating substrate.

(6) The thermal head is used with a recording apparatus comprising a picture signal generating source, a control signal generating portion, a signal control portion, a mechanism control portion, a recording medium and a mechanism portion.

To attain the objects of the invention, the

The heating resistors separated by the electrodes and the highly resistive regions are electrically separated from each other, so that a heating resistor part corresponding to one picture element of the image signal is heated by a current flowing only into the heating resistor part through the common electrode supplied with an electric power and the signal electrode. Further, a plurality of signal electrodes are provided so as to provide a plurality of the heating resistor portions, each heating one picture element independently thereby to make halftone recording possible. Further, the highly resistive regions are arranged at intervals of every one, two or four heating resistor portions for reducing the number of common electrodes to thereby reduce the size of the one-dot area of the thermal head. Further, the length of the highly resistive region is set to be shorter than the length of the heating resistor portion, to reduce the distance between two dots to thereby reduce the area of the non-heating portion.

The form of the heating resistor corresponding to one picture element is defined by the form of electrodes. The current density in the current path between electrodes takes a maximum value in the center of each heating resistor portion, so that the center of heating is set to the center of the heating resistor portion and, accordingly, heat is spread outward uniformly.

Designation parameters, such as dimensions and resistivities for determining the values of resistance in the highly resistive regions are given to the heating resistors so that the stray current (electrical crosstalk) between adjacent heating resistors and heat interference can be prevented.

Voltage pulses are supplied to a plurality of resistor portions, each capable of heating independently one picture element, at respective timings by driving elements of the driving circuit provided to the heating resistor portions, respectively, whereby the heating quantity is controlled through controlling of the current density of the heating resistor portions.

Further, the temperature distribution is controlled so that the current density at the time of the starting of current supply is increased and the current density is decreased after the temperature of the heating resistor reaches a recordable value.

One of the heating resistor portions is selected by one signal electrode and the value of its resistance is measured to thereby separately correct the values of resistance of the heating resistor portion and the highly resistive region.

Further, the highly resistive regions are formed by partly removing the resistor through radiation of a laser or electron beam which is adapted to form the highly resistive regions, having no effect on heating without the necessity of accuracy. Further, a method of producing the thermal head of the invention is provided with no undesired influence on the heating resistor portions effective for recording.

Further, in the case of a thick-film resistor, the highly resistive regions are formed by using the displacement characteristic of the thick-film resistor that the value of resistance is increased at its part by application of high-voltage pulses or a large current to the part. This is effective to reduce greatly the time required for producing the thermal head through forming a plurality of highly resistive regions simultaneously, resulting in, accordingly, cost reduction.

Furthermore, in the highly resistive region forming method, the step of correcting the value of resistance can be added after the completion of production of the thermal head.

The number of recording dots per unit length can be increased to improve the recording density characteristic in recording of low density. Accordingly, a beautiful image is recorded with superfine and halftone recording characteristics.

DETAILED DESCRIPTION OF THE PREFERRED EMBODIMENTS

Although it is preferable that highly resistive regions according to the present invention are insulated perfectly, the highly resistive region may be provided by increasing its sheet resistance more than that of the heating resistor or by cutting the resistor member physically to form a gap. Accordingly, the highly resistive region includes a portion where the electric current flowing therethrough is small enough to have substantially no effect on the heating and recording characteristic caused by the electric current flowing in the heating resistor. Hereinafter, the words "forming highly resistive regions" may be merely described as "making highly resistive".

Figure 26:
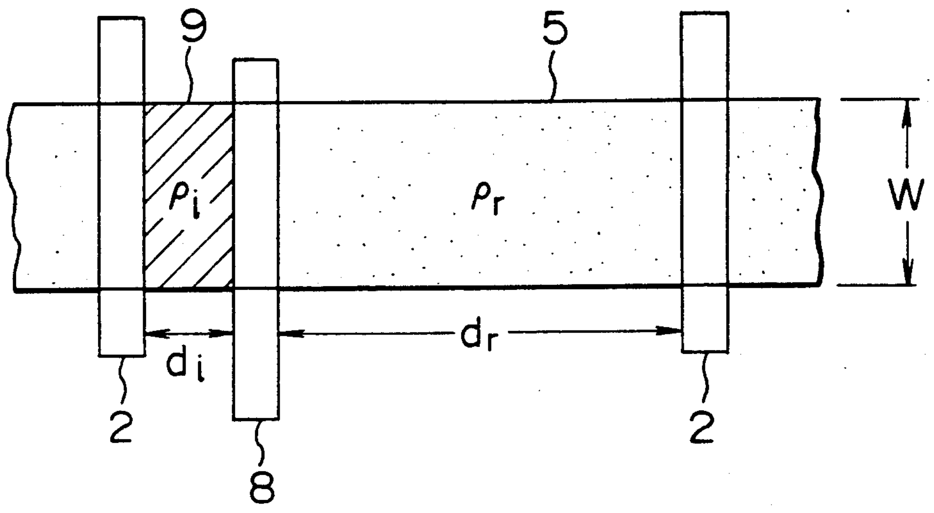
FIGS. 26 and 27 are graphs showing the characteristic of the thermal head according to the present invention.

In the following, the difference between the resistance value of the highly resistive region and that of the heating resistor portion concerned with recording required for achieving the effect of the present invention is described For simplification, the arrangement as shown in FIG. 26 is used in the following description. In short, the thermal head is configured as follows. The heating resistor portion 5 has one side connected to a source electrode 2 (called "common electrode" because such electrodes can be provided commonly to a number of such heating resistor portions depending on the arrangement thereof) and the other side connected to a signal electrode 8 (called "individual electrode" because the signal is applied independently). The highly resistive region 9 is adjacent to the heating resistor portion 5 so that the heating resistor portion is disposed between one source electrode 2 and one signal electrode 8 so that it provides a unit resistor of which the heating state can be controlled by one signal. In the sense as described above, the resistor 5 disposed between the two electrodes is hereinafter called "heating resistor portion". However, in the case where the heating portion of the resistor is obvious, the resistor portion 5 may be merely called "resistor". Because the current density in a portion where the electrode and the resistor overlap is considered to be less than the current density in a portion where the electrode and the resistor do not overlap, the heating resistor portion is defined as a portion which is disposed between the source electrode 2 and the signal electrode 8. Accordingly, the portion between the resistor and the electrode exclusive is hereinafter defined as the heating resistor portion.

In FIG. 26, the length, width (widthwise length in the case where the resistor is formed like a belt) and sheet resistance of the heating resistor portion 5 between the source electrode 2 and the signal electrode are represented by $d_r$, W and $\rho_r$ respectively. The length and sheet resistance of the highly resistive region are represented by $d_i$ and $p_i$, respectively. When the highly resistive region and the heating resistor portion are energized, an electric power applied to unit area in the thermal head is calculated as follows.

First, the resistance values are calculated by the following equations.

The resistance $R_1$ of the highly resistive region between the electrodes is represented by the equation (1).

$$R_i = \rho_i \frac{d_i}{W} \tag{1}$$

The resistance $R_r$ of the heating resistor portion between the electrodes is represented by the equation (2).

$$R_r = \rho_r \frac{d_r}{W} \quad (2)$$

The electric power E is represented by the equation (3)

$$E = V \cdot I = V \cdot (V/R) = V^2/R \quad (3)$$

where V represents a source power voltage, and I represents a current flowing therethrough.

The electric power $E_i$ in the highly resistive region is represented by the equation (4).

$$E_i = V^2 / \left( \rho_i \frac{d_i}{W} \right) \quad (4)$$

The electric power $E_r$ in the heating resistor portion is represented by the equation (5).

$$E_r = V^2 / \left( \rho_i \frac{d_i}{W} \right) \quad (5)$$

The ratio of the applied electric power $E_i$ to the electric power $E_r$ is concerned with the half-tone of a visual image recorded on a recording member through a recording medium which receives image-wise heat reaction. Accordingly, the highly resistive ratio K i.e. the degree of resistance of the highly resistive region compared with the heating resistor portion can be represented by the following equation.

$$K = E_i/E_r \frac{\rho_r d_r}{\rho_i d_i}$$

In short, K is a product of the ratio of the sheet resistance of the heating resistor portion to that of the highly resistive portion and the ratio of the resistor length of the former to that of the latter.

Figure 27:
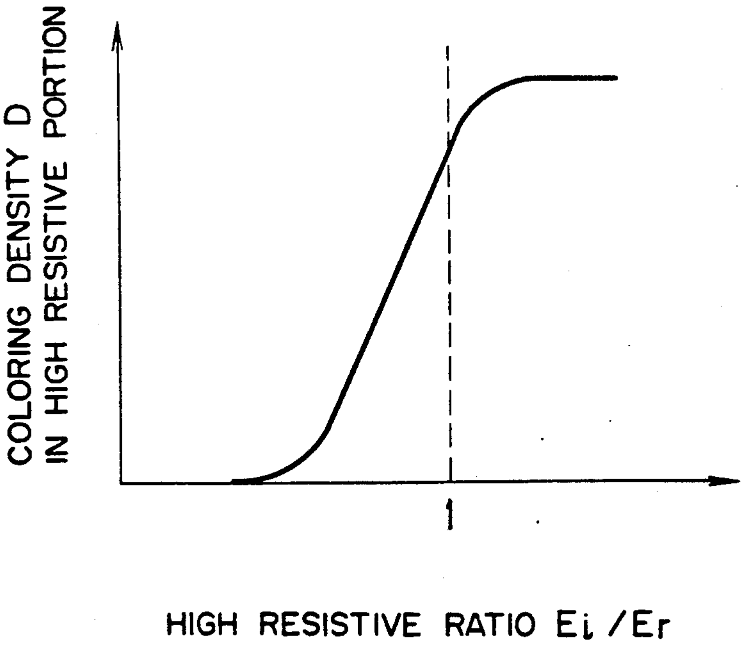

When the influence of the heating quantity of the highly resistor region on the recording member is estimated based on the coloring density D thereof, it is understood that the coloring density has a threshold with respect to the highly resistive ratio K as shown in FIG. 27. This indicates physically that the density of undesired coloring caused by heat leakage (cross-talk) from the highly resistive region is reduced sharply when the highly resistive ratio K is less than 1. Accordingly, the effect of the invention can be obtained by the ratio $E_i/E_r$ in a range of less than 1.

Next the transmission of the heat produced by the heating resistor portion about the recording medium and recording member is explained with reference to FIGS. 28A, 28B and 28C. The subject to be considered is the heating resistor portion. Because the highly resistive ratio is determined so as to sufficiently reduce the coloring density caused by the highly resistive region as described above with reference to FIG. 27, the heating quantity in the highly resistive region is now neglected.

Figure 28A:
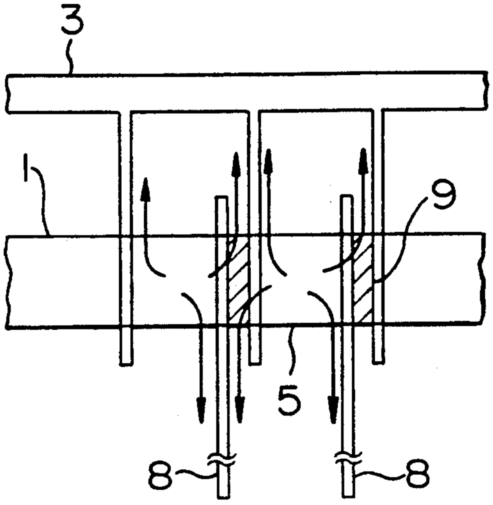
FIGS. 28A, 28B and 28C are diagrams showing varieties of the heat transmission path of the thermal head according to the invention.
Figure 28B:
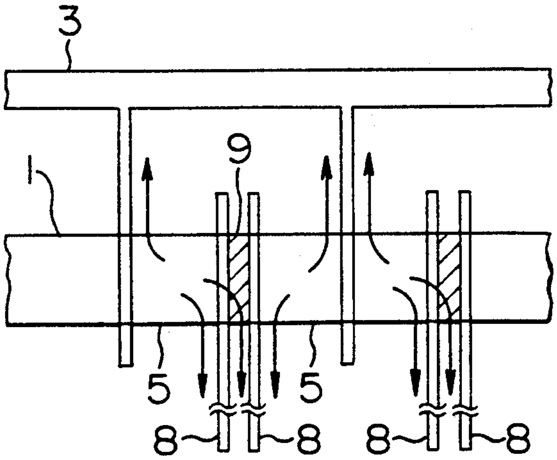
Figure 28C:
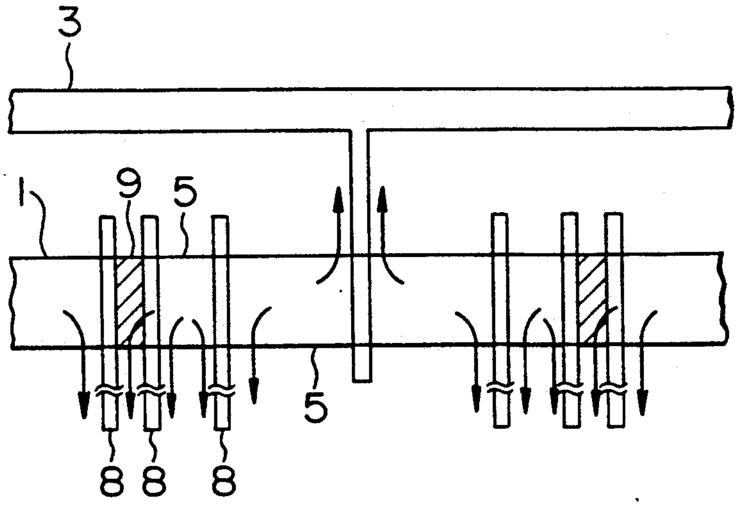

FIG. 28A shows the portion arrangement in which the highly resistive regions are provided at intervals of one of the heating resistor portions separated by the electrodes. FIG. 28B shows an arrangement in which the highly resistive regions are provided at intervals of two heating resistor portions separated by the electrodes. FIG. 28C shows an arrangement in which the highly resistive regions are provided at intervals of four heating resistor portions separated by the electrodes. Because the heat produced by the heating resistor portion escapes into the electrodes between which the portion is disposed as well as electrodes adjacent thereto, the influence (cross-talk) on the coloring density caused by the heat transmission to adjacent heating resistor portions is effectively reduced.

Figure 1:
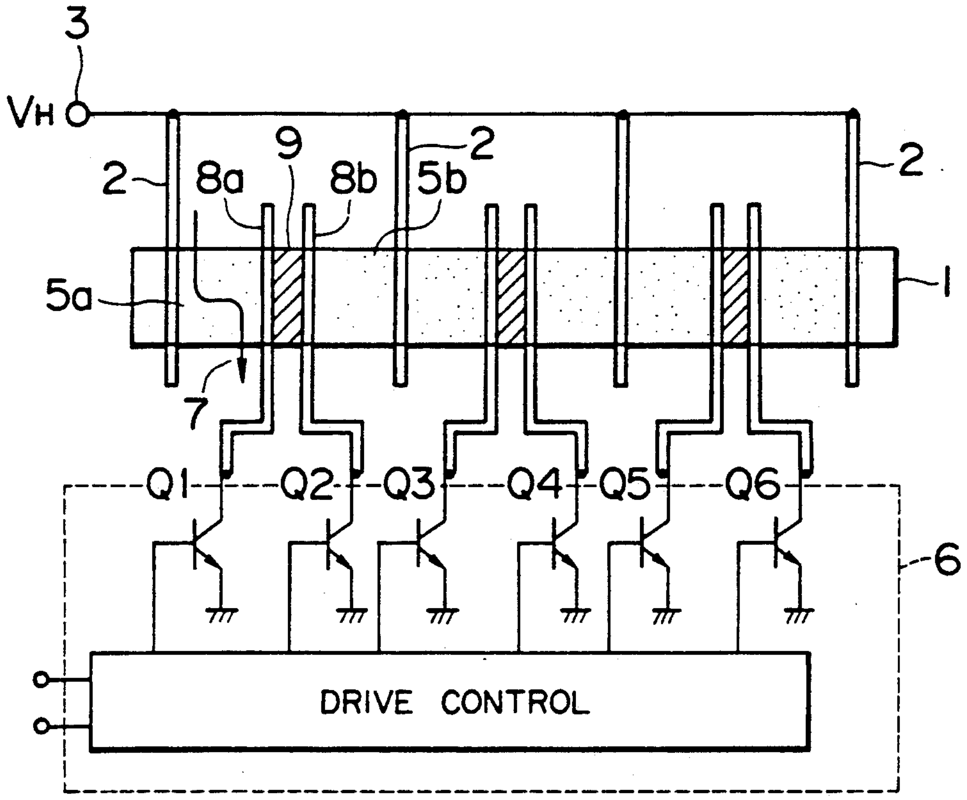
FIG. 1 is a diagram showing an embodiment of the present invention.

In the embodiment as shown in FIG. 1 the control of the thermal head having switching (opening/closing) devices and a driving circuit is improved by providing one highly resistive region 9 between every two of the heating resistor portions. When the output, for example, $Q_1$ of a driving element in the driving circuit 6 is turned ON, a current 7 flows from the electric power source 3 to the heating resistor 5*a* through the common electrode 2 and the electrode 8*a*, so as to produce heat therein. However, no current flows in the heating resistor 5*b*, because the current path between the opposite electrodes 8*a* and 8*b* is cut off by the highly resistive region 9. Further, the length of the highly resistive region 9 between the electrodes can be minimized so far as it provides a necessary value of the high resistive ratio. Accordingly, the total area of the non-heating portions of the head is very small so that a sufficiently high saturation or maximum density can be obtained.

Accordingly, the embodiment of the invention has the following effects. (1) Picture elements can be controlled independently. (2) A thermal head adapted to produce superfine recording can be obtained without cross-talk current between adjacent heating resistors, because one common electrode is used for two picture elements. (3) A low-cost thermal head can be obtained, because the number of the highly resistive regions can be reduced to one per two picture elements and, accordingly, the working time for construction of the highly resistive regions in the thermal heads can be reduced greatly.

Figure 2:
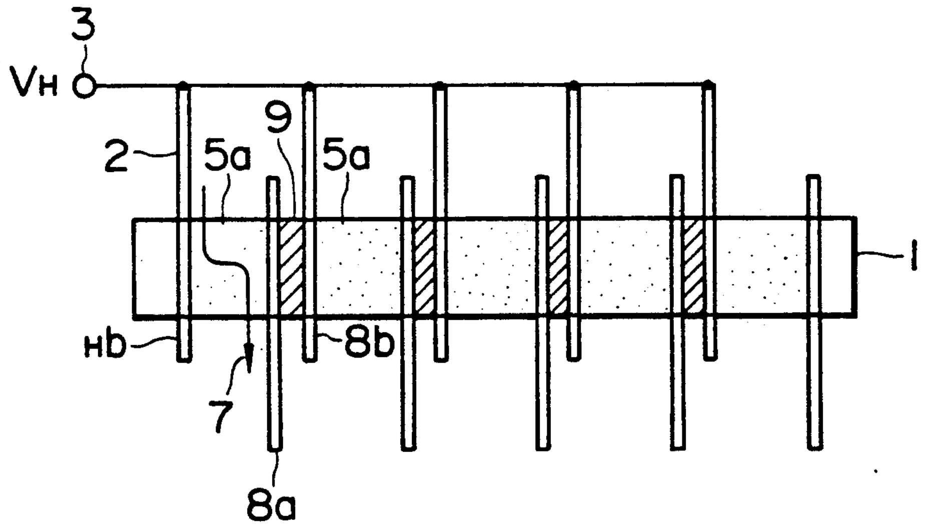
FIGS. 2 and 3 are diagrams showing other embodiments of the present invention.

FIG. 2 is a plan view showing another embodiment of the present invention.

In this embodiment, the arrangement in connection of the driving elements and the individual electrodes is the same as that in FIG. 1 and the illustration thereof will be omitted for the embodiment of FIG. 2, as well as other embodiments described hereinafter.

The basic construction of this embodiment is substantially the same as that in FIG. 1 except that the highly resistive regions are provided at intervals of one heating resistor portion formed by dividing a belt-like resistor by electrodes. This embodiment is characterized in that the resistor 9 interposed between a pair of electrodes 8*a* and 8*b* is formed to have high resistance. The current path at the time of heating in this embodiment is the same as in FIG. 1. When the output of the driving element (not shown in FIG. 2) connected to the individual electrode 8*a* is turned ON, a current 7 flows from the electric power source 3 to the individual electrode 8*a* to thereby heat the heating resistor 5*a*.

This embodiment is further characterized in that the respective heating resistors are disposed at equal pitches so that the picture elements are arranged at equal pitches and the heating resistors have equal heat transmission paths because this embodiment is constructed by repetition of a combination of a common electrode 8*b*, a heating resistor 5*a* and a highly resistive region 9. In general, picture quality can deteriorate since white stripes produced in the non-recording portions formed correspondingly to the highly resistive regions are more striking. However, the white stripes become less striking as the white stripes are disposed at smaller pitches and higher regularity. Thus, according to this embodiment, a thermal head having so high quality that the white stripes are less striking and capable of superfine recording can be obtained because the pitches of the white stripes appearing between dots corresponding to the non-recording portions can be equalized by providing the picture elements of the same size and having the same heat transmission path.

Figure 3:
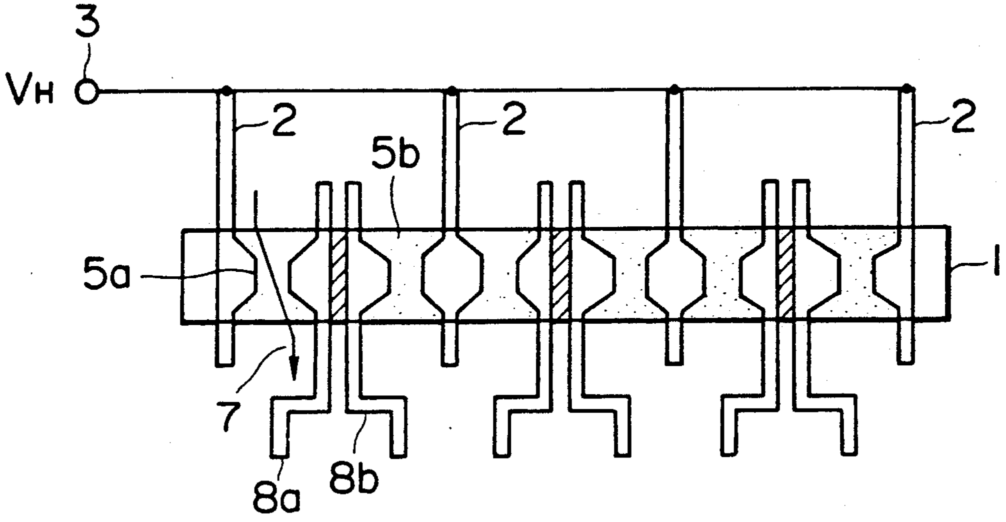

FIG. 3 is a plan view of the thermal head in which a current density concentrating portion is provided in each of the heating resistors. When the time interval and/or the electric power for energizing the heating resistor having the current density concentrating portion, that is, applied energy, is changed, the size of recordable high temperature region is changed corresponding to the applied energy.

Figure 4:
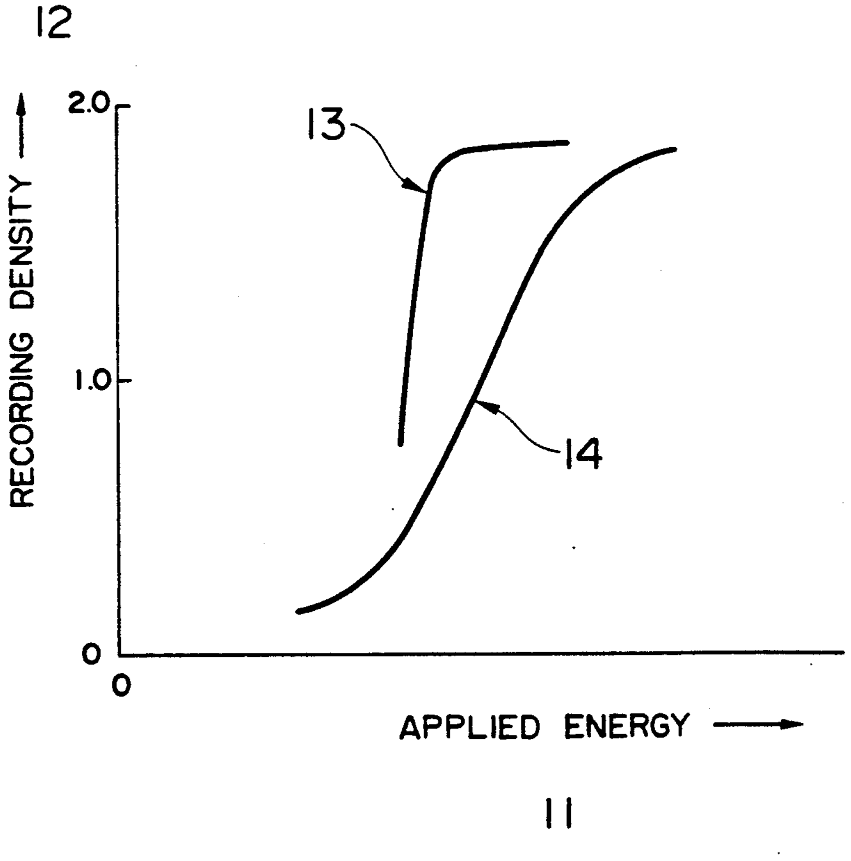
FIG. 4 is a graph showing the characteristic of the thermal head according to the invention.

FIG. 4 shows the recording density characteristic of the thermal head constituted by the heating resistors having such current density concentrating portions. In the drawing the curve 14 shows the recording density characteristic of the thermal head according to this embodiment and the curve 13 shows the recording density characteristic of a conventional thermal head constituted by heating resistors having no current density concentrating portion. As the applied energy in the thermal head according to this embodiment increases, the recording density increases, as shown by the curve 14, relatively slowly compared with the curve 13. In short, this indicates that heat generation is controlled with high accuracy. The area of recording dot is changed corresponding to the applied energy. Accordingly, halftone recording is attained by changing the are of recording dot. On the other hand, since the conventional thermal head shown by the curve 3 has no current density concentrating portion, the temperature is substantially constant in any place on the heating resistors. Accordingly, in the conventional head, the recording density 12 sharply increases to the saturation density (the slope of the curve 13 is steep) when the applied energy is given to the heating resistor so as to heat the resistor at a temperature exceeding a critical temperature value for recording. Consequently, in the conventional head, it is difficult to reproduce halftone recording density with high accuracy.

According to this embodiment, current density concentrating portions are provided on the heating resistors, so that the thermal head capable of controlling heating with high accuracy correspondingly to the applied energy and capable of halftone recording can be obtained.

FIGS. 5 through 8 show other embodiments of the thermal head according to the present invention.

The basic configuration in the embodiments is similar to the embodiment as shown in FIG. 3 except that electrodes are formed so as to equalize the picture element pitches represented by the distances between every adjacent heating centers where the heating center is defined as maximum temperature portion of the heating resistor.

Figure 5:
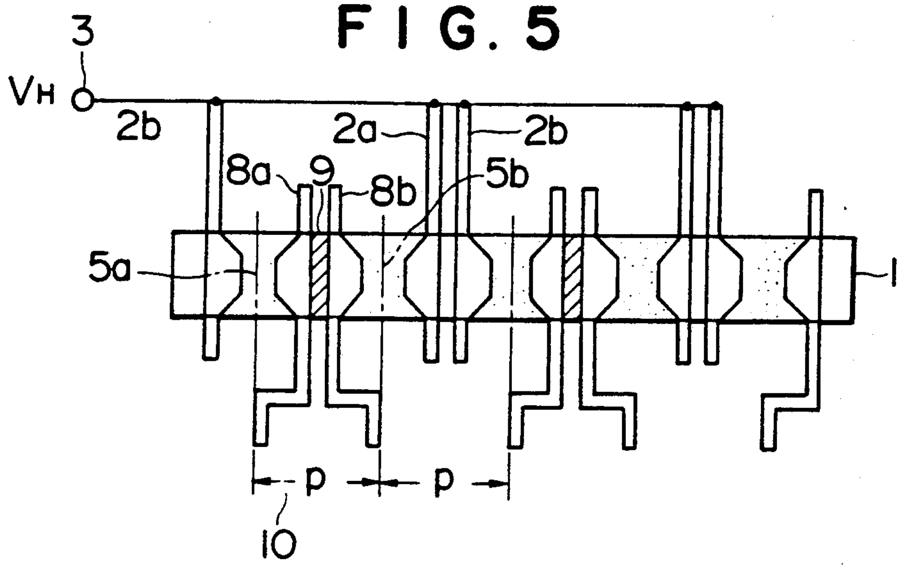
FIGS. 5, 6, 7, 8, 9, 10A, 10B, 11A and 11B are diagrams showing further embodiments of the present invention.

In the embodiment as shown in FIG. 5, the forms of the current density concentrating portions of the heating resistors are the same as the embodiment as shown in FIG. 3. However, in FIG. 5, the picture element pitch 10 is constant and, further, the common electrode 2*a* and the individual electrode 8*a* are formed to make the left and right sides of the heating resistor symmetrical with each other. Furthermore, the common electrode 2*d* and the individual electrode 8*d* are formed similarly in shape. However, the common electrodes 2*a* and 2*b* are at the same potential. Accordingly, it is unnecessary to provide any highly resistive portion between the electrodes 2*a* and 2*b*. Consequently, the portion between the electrodes 2*a* and 2*b* may be formed by the electrode material.

According to this embodiment, heating resistors are formed so as to provide equal picture element pitches and equal heat transmission paths in the structure of the thermal head in which the highly resistive regions are arranged at intervals of two resistors so that the number of the highly resistive regions is made smaller. Accordingly, the white stripes appearing between dots correspondingly to the non-recording portions are at the same pitch, so that a thermal head capable of controlling heating with high accuracy and making the white stripes less striking can be attained by a producing process that is a less time consuming and of lower cost.

Figure 6:
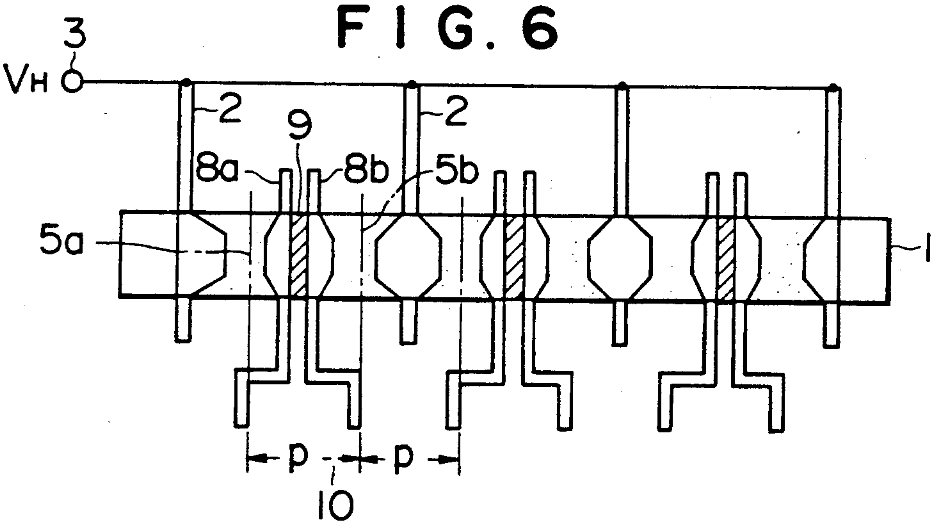

The embodiment in FIG. 6 is characterized in that the heating resistors are formed with asymmetry between its left and right sides, while the pitches between the heating centers of the heating resistors, that is, the picture element pitches 10, are equalized.

The dimensional relation is described with reference to FIG. 7 in the case where the heating resistors are in the form of asymmetry and the picture element pitches are equalized. The picture element pitch 10 is represented by the equation $$p = \frac{d_i}{2} + \frac{3}{2} de + h1 + h2 + r$$

in which p represents the picture element pitch 10, $d_e$ represents the width of the linear portion of the respective electrode, $d_i$ represents the width of the highly resistive region, $h_1$ represents the width of the projected portion of the electrode for providing the current density concentrating portion at its side close to the highly resistive region, $h_2$ represents the width of the opposite projected portion of the electrode at its side closer to the common electrode and r represents the minimum width (the width of the narrow portion) of the heating resistor.

To keep the picture element pitch constant with the heating center coinciding with the center of the picture element, it is necessary that the distance between the center of the heating resistor and the center of the highly resistive region and the distance between the center of the heating resistor and the center of the common electrode are equal to ($\frac{1}{2}$)p. Accordingly, the picture element pitches are made equal when the following equation is satisfied.

$$d_i + d_e = 2(h2 - h1)$$

The minimum pitch is, under the condition satisfying the above equation, obtained in the case of $h_1 = 0$. In this case, the picture element minimum pitch p min is given by the following equation.

$$pmin = d_i + 2d_e + r$$

Assuming now that $d_i$, $d_e$ and r are all 15 μm under the consideration that the etching accuracy in the current thick-film process limits the minimum line width and the minimum distance between the lines to about 10 μm, then the possible minimum picture element pitch is 60 μm. The number of picture elements is 16.7 per 1 mm width under this condition. As described above, it is to be understood that a thermal head capable of halftone recording and high-accurate heating control and capable of recording dots in a constant pitch of 16 pixels/mm can be obtained by the current thick film process.

Figure 8:
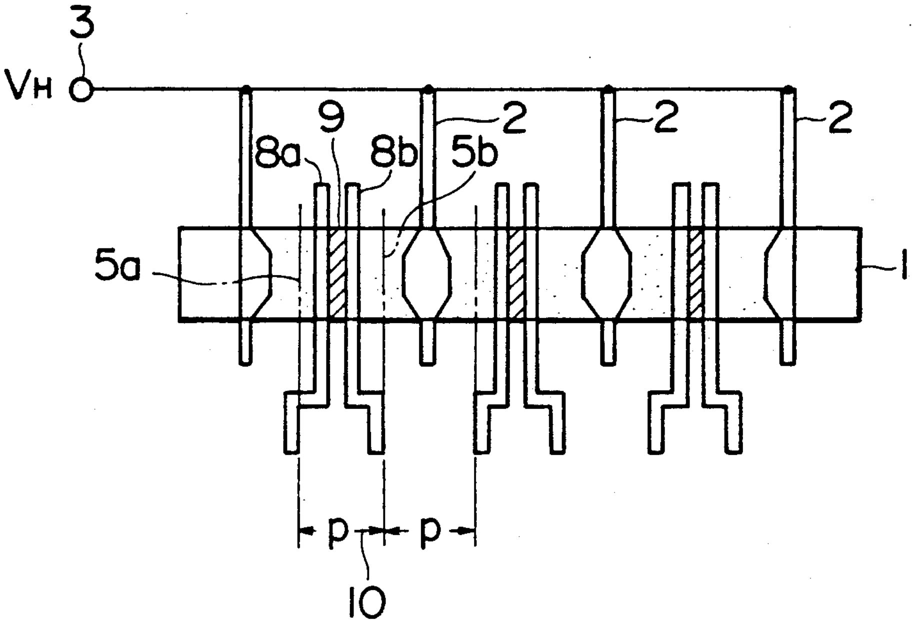

FIG. 8 is a plan view showing the embodiment in the case of the thermal head having the minimum pitch described above. In this embodiment, a structure in which the projection of the heating resistor portion is omitted at its side closer to the highly resistive region or the individual electrode.

According to the construction, the number of heating resistors can be increased without increasing the length of the thermal head, so that a high-resolution thermal head can be obtained. Further, the length of the thermal head in the line direction can be reduced with the length of each respective resistor unchanged.

Figure 7:
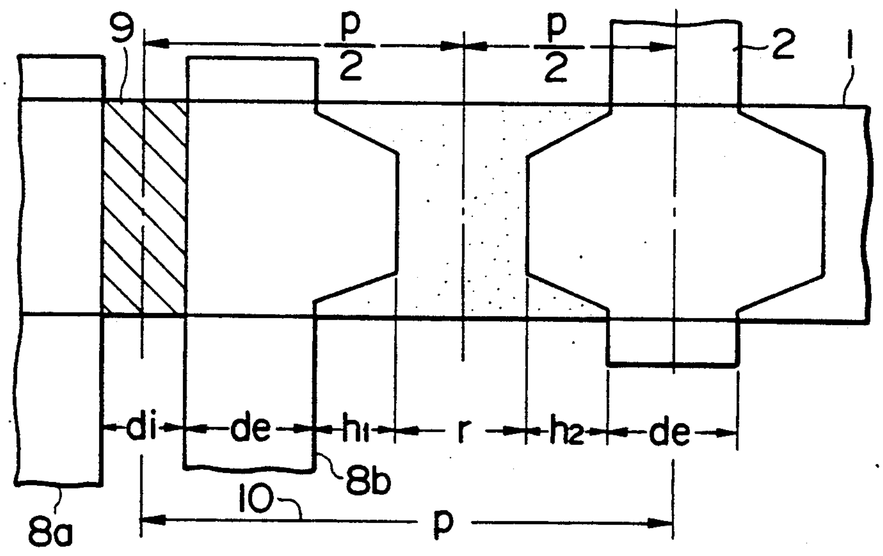

According to the embodiments of the invention as shown in FIGS. 6 through 8, the picture element pitches are equalized by forming asymmetric heating resistors of asymmetry for providing the current density concentrating portions. Further, it is possible to attain high-quality recording attributing to making the white stripes between recording dots less striking and halftone recording attributing to the current density concentrating portions. Consequently, a thermal head capable of high-accurate heating control is attained.

Figure 9:
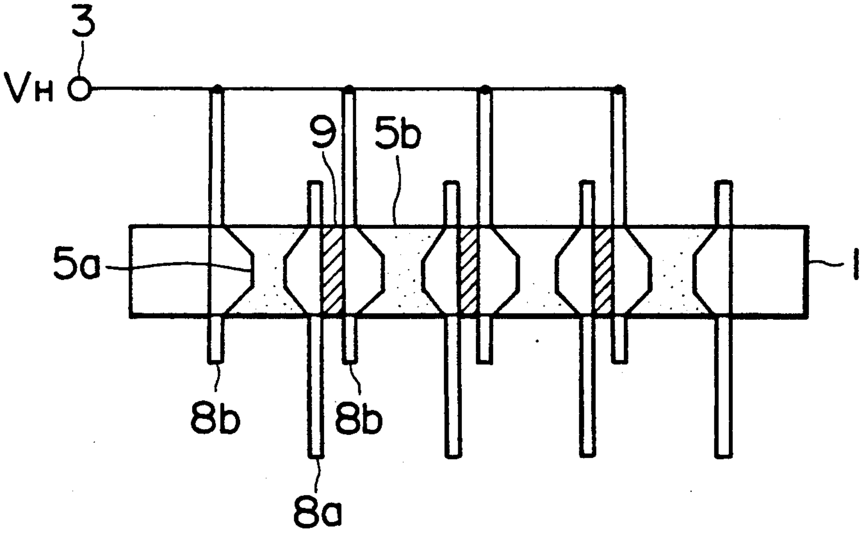

FIG. 9 is a plan view showing a further embodiment in the case where the current density concentrating portion is provided to the heating resistor portion in the embodiment of FIG. 2.

This embodiment is constituted by repetition of a combination of a common electrode 8b, a heating resistor 5a, an individual electrode 8a and a highly resistive region 9. Accordingly, the same picture element pitch and same heat transmission path are provided to the respective heating resistors regardless of the form of the current density concentrating portion of the heating resistor. The same picture element pitch and same heat transmission path are effective to arrange the recorded dots at the same pitch. Consequently, a thermal head having a high freedom in the form of the current density concentrating portion and capably of high-accurate heating control contributes to making the white stripes between the dots being less striking.

Figure 10A:
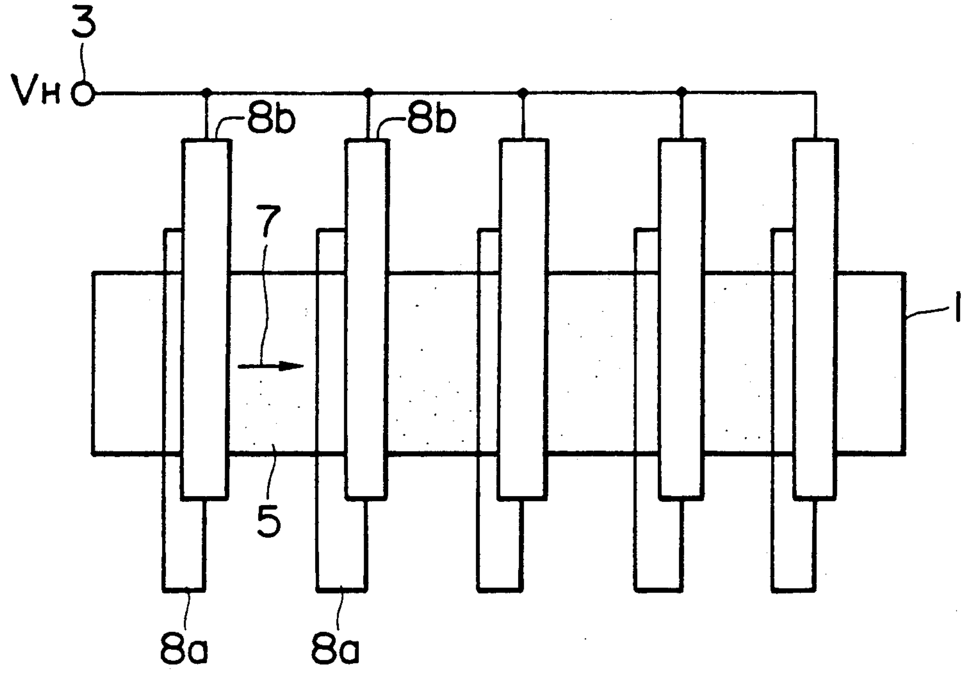
Figure 10B:
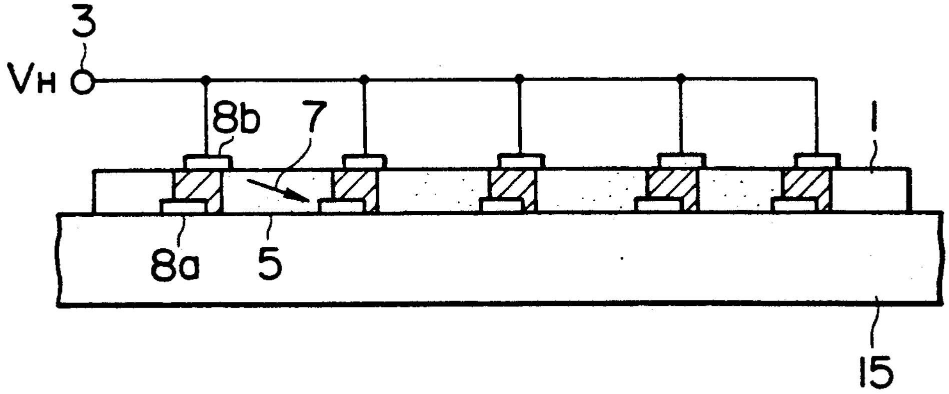

FIGS. 10A and 10B are a plan view and a sectional view of a further embodiment of the invention.

This embodiment is characterized in that the individual electrodes 8a are disposed under the resistor 1; common electrodes 8b are disposed on the resistor so as to overlap with the individual electrodes; and the resistor portions each disposed between the upper and lower electrodes are formed to have high resistance. In respect to the current path at the time of heating, the current 7 in FIG. 10A flows from the electric power source 3 to the adjacent individual electrode 8a via the common electrode 8b and the heating resistor 5. At this time, it is important to form a structure as shown in FIG. 10B in which the portion between the pair of electrodes 8a and 8b is formed to have high resistance to thereby prevent cross-talk currents (leaking currents or stray currents) from flowing between the paired resistors and in which a part of each of the common and individual electrodes is in contact with a part of the heating resistor 5 to thereby keep the current path 7 between the common electrode and the adjacent individual electrode.

According to this embodiment, the highly resistive regions are interposed between the two groups of electrodes and, further, the electrodes overlap with each other. Accordingly, the area occupied by the electrodes and the highly resistive regions can be reduced greatly, thus attaining a superfine thermal head.

Although this embodiment uses facing-plate electrodes, the same effect can be obtained even by using the electrodes having current density concentrating portions. Accordingly, the structure in this embodiment can be applied to the thermal head capable of halftone recording by using the current density concentrating portions.

FIGS. 11A, 11B and 12 through 15 show further embodiments of the thermal head according to the present invention and the head driving circuit thereof.

Figure 11A:
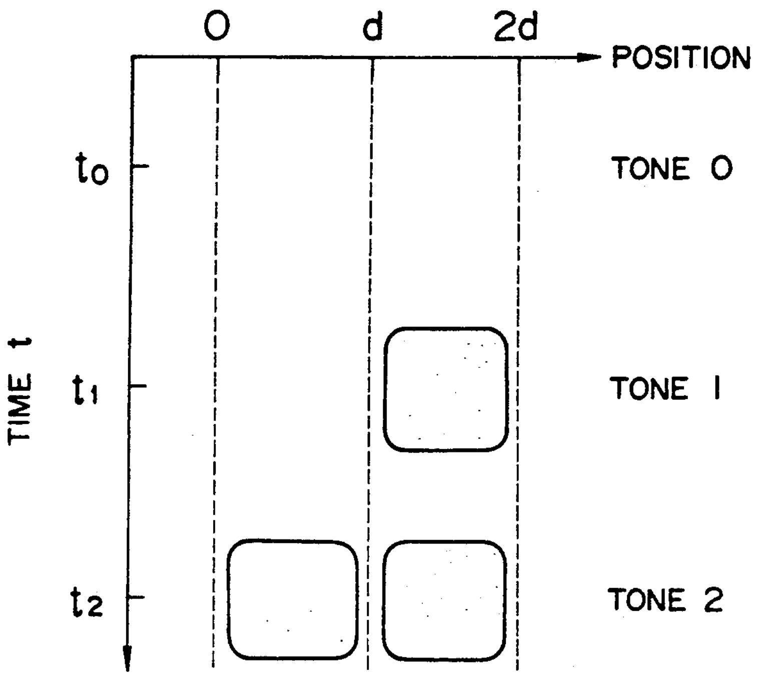
Figure 11B:
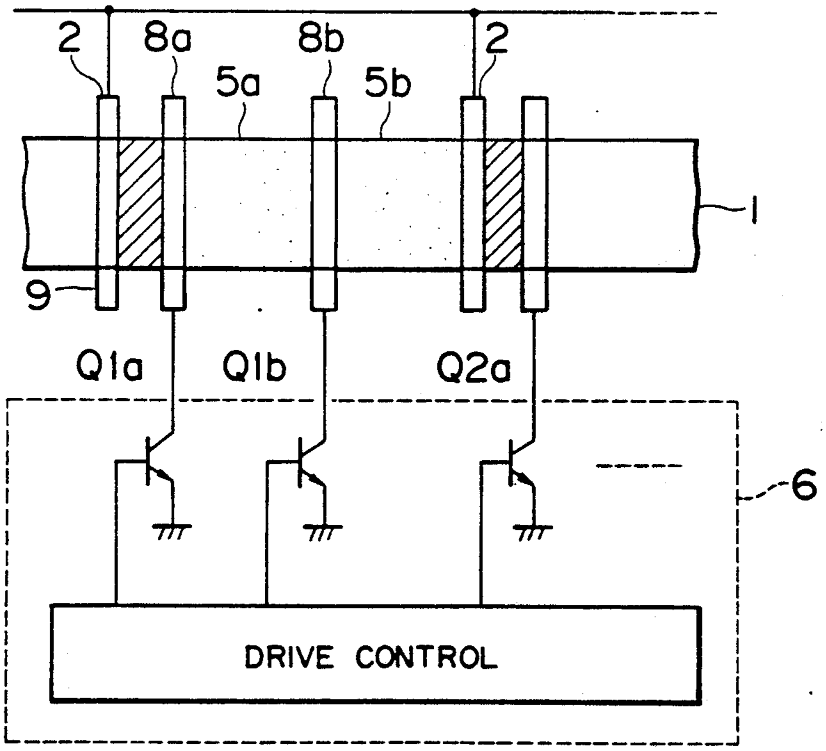

FIG. 11B is a plan view of a modification of the thermal head of FIG. 1 in which highly resistive regions are arranged at intervals of two heating resistors separated by electrodes, that is, at intervals of two dots.

The basic construction of the electrodes and resistors is the same as that in FIG. 1, except that one picture element is formed by two resistors 5a and 5b so that a current can flow into the resistor 5a through the resistor 5b. The current flows through the resistors 5a and 5b, respectively, and the resulted current densities are controlled by the output signals $Q_{1a}$ and $Q_{1b}$ of two switching devices. In short, when the output signals $Q_{1a}$ and $Q_{1b}$ are respectively in OFF and ON states, the resistors 5a and 5b are respectively in the non-heating state and heating state with high current density. When the width of the resistors 5a is equal to the width of the resistor 5b, a dot having a size of about half the picture element area (5a+5b) is recorded stably. When the output signals $Q_{1a}$ and $Q_{1b}$ are respectively in ON and OFF states, the resistors 5a and 5b are connected in series to each other to increase the value of resistance by twice, so that the resistors are in the heating state with low current density. At this time, a dot having a size of substantially equal to the picture element area is recorded if the temperature of the resistor reaches a higher value than a critical level necessary for recording.

As the relation between the heating state variation and the resulted recorded image is shown in FIG. 11A, three kinds of tones from tone "0" to tone "2" can be obtained. In short, in this embodiment, halftone recordings of three different tones can be made. In the following, the operation of the apparatus as to the kinds of tones is described with reference to FIG. 11A. In the drawing, the abscissa indicates the distance in the direction of arrangement of the heating resistor, and the ordinate indicates time t.

(1) Case of Tone "0" ($t=t_0$)

Both the heating resistor portions 5a and 5b are in the non heating state, so that the recorded dot is white, i.e. no dot is recorded.

(2) Case of Tone "1" ($t=t_1$)

The heating resistor portion 5b is alone heated, whereas the heating resistor portion 5a is not heated. The current density in the heating resistor portion 5b is highest, so that the temperature thereof rises most quickly to the recording temperature $T_P$ resulting in a dot having a size of half of the picture element.

(3) Case of Tone "2" ($t=t_2$)

The heating resistor portions 5a and 5b are both heated. This case is different from the case (2) in that the heating resistor portions 5a and 5b are connected in series to each other to increase the total resistance by twice. Accordingly, the current density of the heating resistor portion 5b is reduced to half compared with the case (2). The heating state changes with the lapse of time. In short, the heating resistor portion 5a changes from a low temperature to a high temperature during the period from time $t_1$ to time $t_2$, whereas the heating resistor portion 5b changes from a high temperature to a low temperature so that, the temperatures of the heating resistor portions 5a and 5b are made uniform with respect to each other with the lapse of time. In view of heat transmission, the heat in the heating resistor portion 5b is absorbed by the heating resistor portion 5a having a lower temperature, so that the heating resistor portion 5a receives both the heat supplied from the heating resistor portion 5b having a higher temperature and the heat produced in itself. As a result, the temperature of the heating resistor portion 5a reaches a recording temperature $T_P$ more quickly compared with the case where the resistor 5a is heated alone. Accordingly, there arises an effect in that excessive heating can be suppressed compared with the case where the heating resistor portion 5b is alone heated. This is effective to prevent damage such as burning of the recording medium or recording member and abnormal recording. Furthermore, it is also effective, when a recording medium, such as a thermal sublimation ink sheet, having halftone characteristic in itself is used, to exhibit an excellent recording characteristic in recording of low grade tone without burning which often occurs at the portion having high-density recording dots. The above description about the construction, operation and technical effects is true not only for monochromatic recording, but also for polychromatic recording using a polychromatic recording medium or a thermosensitive multi-coloring recording member.

Figure 12A:
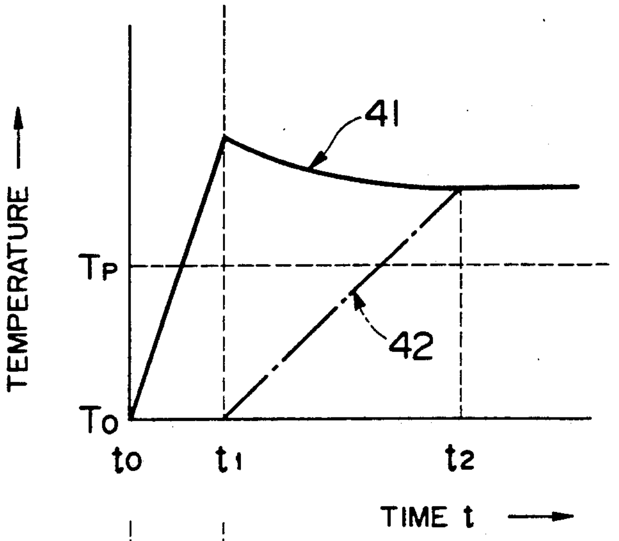
FIGS. 12A and 12B are graphs showing the thermal head controlling method according to the present invention.
Figure 12B:
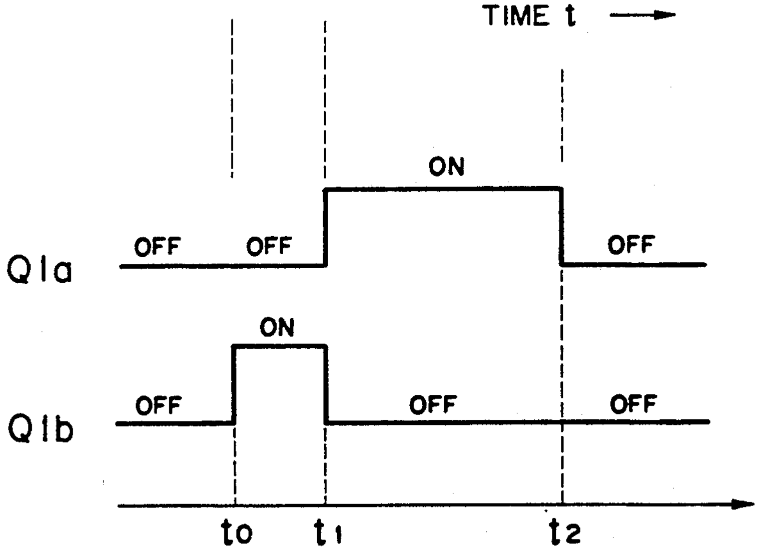

FIG. 12A is a graph of temperature variation vs. time on the resistors 5a and 5b in the case where the thermal head as shown in FIG. 11B is controlled by two switching devices (driving elements of the driving circuit) $Q_{1a}$ and $Q_{1b}$. FIG. 12B is a timing chart of control in the case where the driving elements $Q_{1a}$ and $Q_{1b}$ of the driving circuit are used. In the drawings, the solid line 41 shows the temperature variation on the resistor 5a. When the output signals $Q_{1a}$ and $Q_{1b}$ are respectively turned OFF and ON at time $t_0$, the temperature on the resistor 5b increases quickly over the recording temperature $T_P$ so that a dot having a size substantially equal to that of the resistor 5b is recorded. When the output signals $Q_{1a}$ and $Q_{1b}$ are respectively turned ON and OFF at time $t_1$, the value of resistance increases by twice as represented by 5a+5b. Accordingly, the density of the current flowing in the resistor 5b is reduced to half, so that the rising of the temperature becomes slow. Consequently, the excessive heating of ink can be suppressed so that abnormal recording caused by burning of the ink sheet or the like can be prevented.

Because the adjacent resistor 5b has already reached a high temperature, the resistor 5a reaches the recording temperature quickly. Accordingly, a dot having a size substantially equal to the picture element area is recorded speedily and stably. Consequently, according to this embodiment, the density of the current flowing in the resistor and the heating area are both controlled with the lapse of time, thus to attain speedy and stable three-tone recording.

In the case where the thermal head and the control method of this embodiment are applied to a recording apparatus using a sublimation ink sheet having halftone characteristic in itself so that density can be controlled by pulse width, the heating resistor 5b for low-grade tone can be reduced in size, to thus attain a recording apparatus excellent in recording characteristic, in particular, in low-grade tone.

Figure 13:
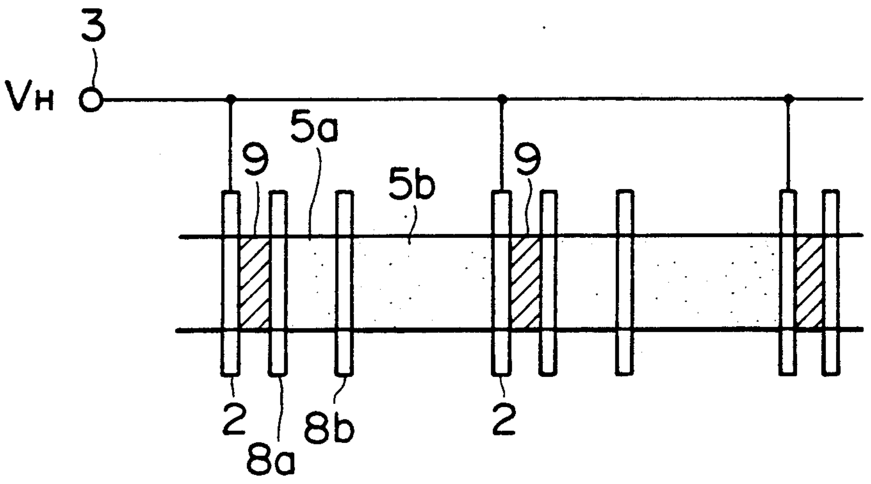
FIGS. 13, 14, 15, 16, 17, 18A and 18B are diagrams showing further embodiments of the present invention.

FIG. 13 is a plan view showing a further embodiment of the thermal head and the control method according to the invention.

The construction is substantially the same as in FIG. 11B except that the heating resistors each forming one picture element are configured by different resistor widths. In this embodiment, the width of the heating resistor 5a defined by an interval between electrodes 8a and 8b is made shorter than the width of the heating resistor 5b, so that the adjustment of heating energy can be made more precisely. Accordingly, not only the effects of three-tone recording and preventing excessive heating as shown in FIG. 12 are obtained but also the variation of heating characteristic caused by variation of the resistance value can be corrected for every picture element (for example, by changing the resistance value of the resistor portion by applying electric pulses).

Figure 14:
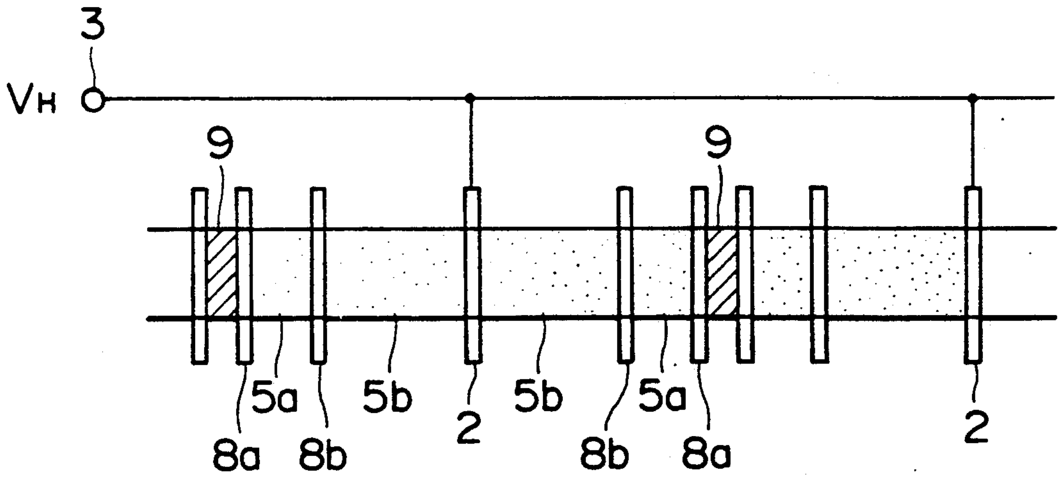

FIG. 14 is a plan view showing a further embodiment in which highly resistive regions are provided at intervals of four resistors separated by electrodes.

The construction is substantially the same as that of FIG. 13, except that one picture element is constituted by two heating resistors and one common electrode and one highly resistive region are provided to every two picture elements. Accordingly, the head line width can be saved, thereby to attain a superfine thermal head.

Although this embodiment uses a construction that one picture element is constituted by two resistors, it is also possible to use a construction that one picture element is constituted by three or more resistors and switching devices ar provided to the electrodes for switching power source thereby to attain stable recording of four or more tones.

Figure 15:
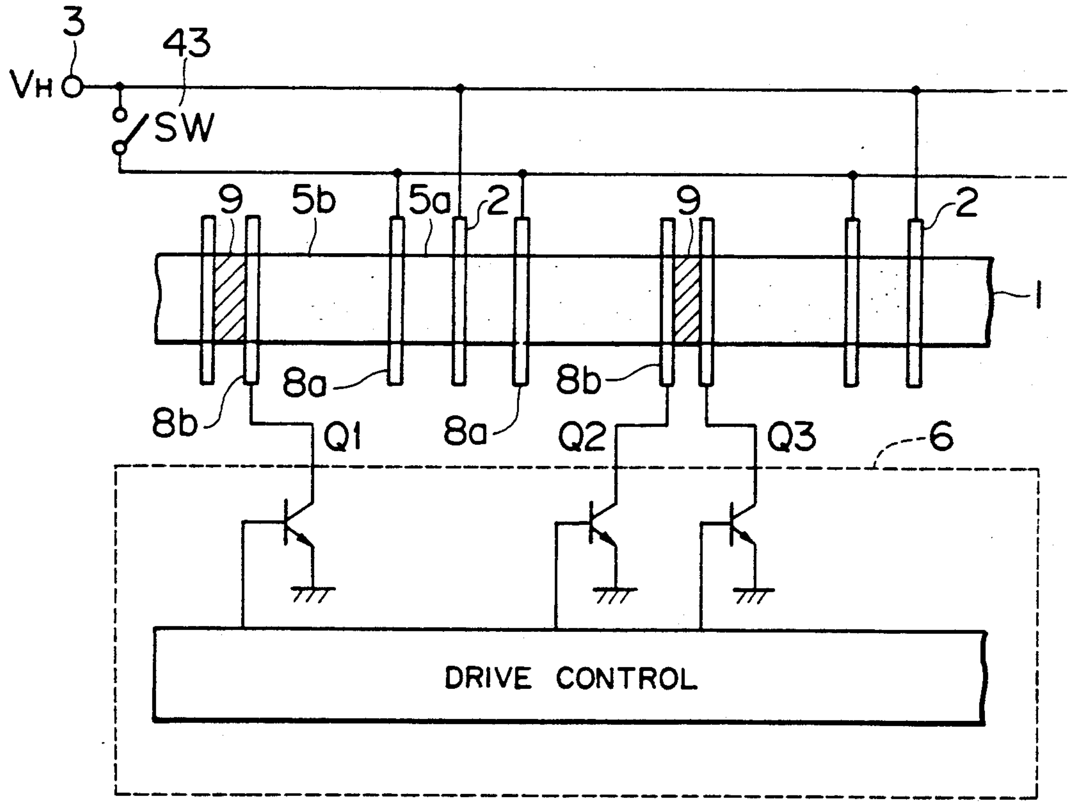

FIG. 15 is a plan view showing a modification of the embodiment in which highly resistive regions are provided at intervals of four resistors.

The construction is substantially the same as that of FIG. 14. This embodiment is characterized in that one picture element is constituted by two heating resistors 5a and 5b and that an electrode 8a is provided as a second common electrode and connected to the first common electrode 2 through a switching device 43. The switching device 43 may be a transistor switch or a mechanical switching device such as a relay. Although this embodiment uses only one switching device 43 for the thermal head, a plurality of switching devices may be provided respectively to the picture elements of the thermal head. The current density of the picture element is controlled by ON/OFF operation of the switching device 43 while the output signals of the driving elements of the driving circuit 6 are turned ON, that is, while the heating resistors are energized.

According to this embodiment, the current density of each of the heating resistors is controlled by addition of the switching device 43 with one output signal of the driving circuit 6 for each picture element, i.e. without increase of the number of output signals in the driving circuit 6. Furthermore, it is effective to control simultaneously all picture elements on one line. Consequently, a thermal head having simple construction and capable of highly accurate heating control and a method of driving the head are provided.

The switching device 43 may be connected with the same effect in any of a bypass mode in which the electric power is supplied selectively to one of the two groups of common electrodes and an addition mode in which the electric power is supplied additionally to one of the two groups of electrodes. The same effect is attained regardless of the connection mode of the switching device. Although this embodiment has shown the case where one electric power source is used for supplying electric power to the two groups of electrodes, two electric power sources may be provided for supplying electric power to the two groups of electrodes independently through the respective switching devices at the same or different timings.

FIGS. 16 through 21 show embodiments of the method of producing the thermal head according to the present invention.

The thermal head producing method according to the present invention is characterized in forming the highly resistive regions adjacent to the heating resistor portions, respectively.

Figure 16:
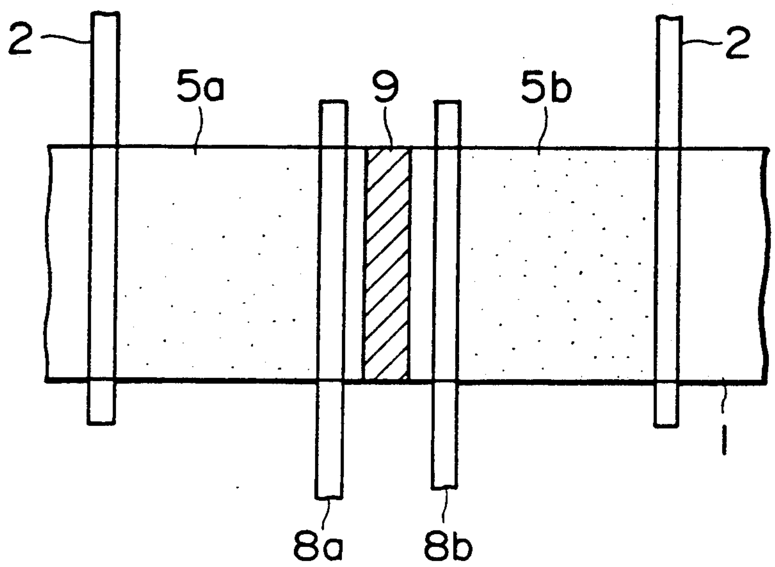
Figure 17:
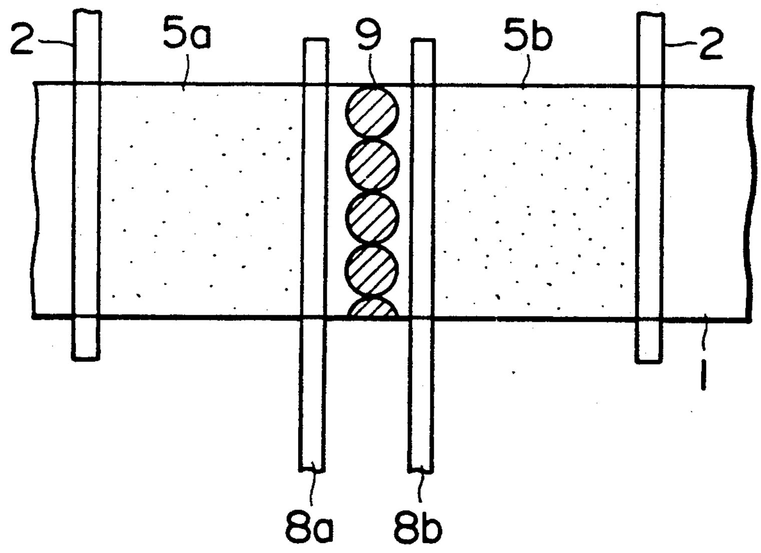

In FIGS. 16 and 17, a part of a resistor between a pair of electrodes is removed by radiation of a laser or electron beam to thereby form high resistance region. FIG. 16 shows an example in which a strip-like part of the resistor is removed so that a high resistance region is formed fully between the pair of electrodes. FIG. 17 shows an example in which a pulsated laser or electron beam is radiated so that the high resistance region is formed by small applied energy in a short time. Though the resistor may remain partly between the pair of electrodes in this case, no problem arises practically if the value of resistance between the pair of electrodes is sufficiently high to reduce cross-talk current. Further, because the resistor between the electrodes is changed to have high resistance in a range which does not contribute to heating, there is no influence of machining accuracy of the laser or electron beam and no damage of the heating resistor.

According to the embodiments, high resistance region is formed between the pair of electrodes by removing unnecessary resistor. Accordingly, a resistance region is formed securely and it is possible to visually inspect the result. Furthermore, there is no damage to the heating resistor.

An additional method for making highly resistive region according to the present invention is described with reference to FIGS. 18A, 18B and 19.

Figure 19:
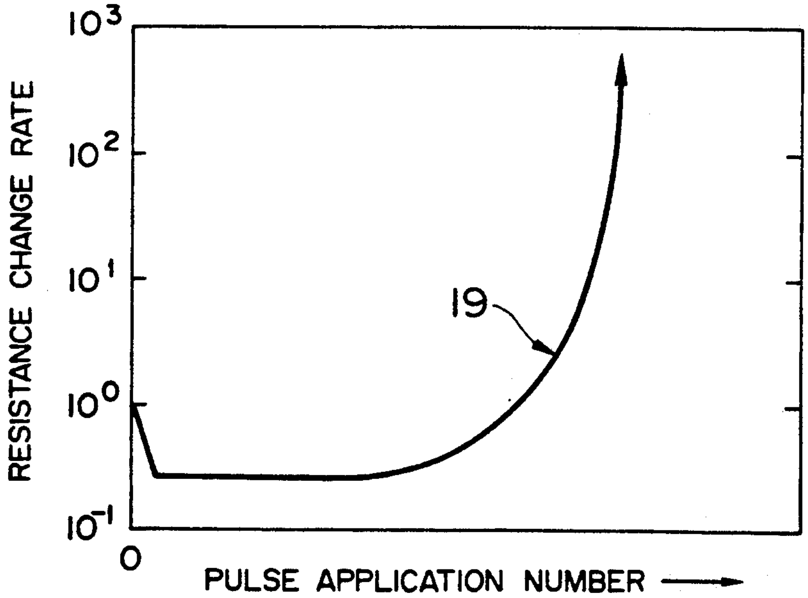
FIGS. 19 and 20 are graphs showing the highly resistive characteristic of the thermal head according to the present invention.

As shown by the characteristic curve 19 of resistance change rate 18 vs. pulse application number 17 in FIG. 19, a thick-film resistor mainly containing ruthenium oxide has such properties that when voltage pulse energy exceeding a predetermined level is repeatedly applied to the resistor, the resistance value decreases initially and when the pulse application number 17 increases further, the electrical connection between resistor particles is broken by electric field so that the resistance value increases rapidly so that the resistor acts as an insulator.

Figure 18A:
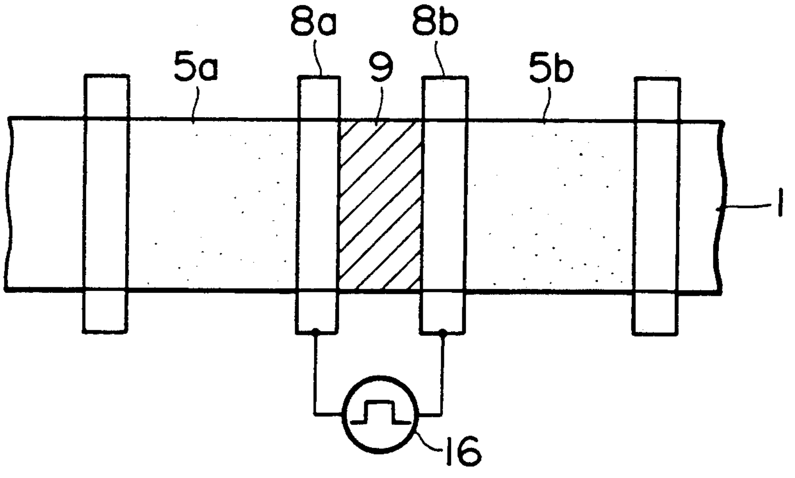

FIG. 18A typically shows the method of forming high resistance between the pair of electrodes by use of the aforementioned properties of the thick-film resistor. As shown in FIG. 18A, the output terminals of a pulse electric source 16 are connected to the pair of electrodes 8*a* and 8*b* to apply voltage pulses thereto. The voltage level and the number of applied pulses necessary for forming high resistance may be determined from the preliminarily measured characteristic. Alternately, the voltage pulses may be applied thereto while measuring the value of resistance between the pair of electrodes, so that the application of pulses is stopped when it is detected that the value of resistance reaches a predetermined resistance value. The predetermined resistance value is such a value of the resistance which negligibly affects the recording characteristic. For example, when the width of the highly resistive region is sufficiently smaller than the width of the heating resistor, it is enough to make the resistance of the highly resistive region higher than that of the heating resistor. Furthermore, a plurality of highly resistive regions may be produced simultaneously by applying to the corresponding pairs of electrodes electric pulses from an electric pulse source 16 whose output impedance is lowered and whose output capacity is increased.

Figure 18B:
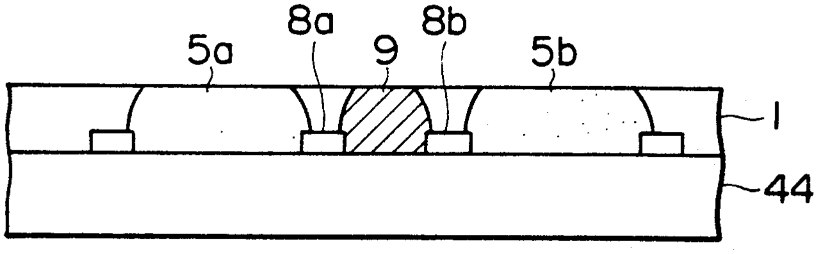

FIG. 18B is a sectional view of the thermal head having high resistance regions formed by the aforementioned steps.

In formation of a high resistance region, voltage pulse application is accompanied with fine electric discharges which are effective to form high resistance at the positions where the fine electric discharges are produced. Generally, the fine electric discharge paths are produced at portions of high electric field. In a rare case, the discharge paths become irregular, and the irregularity of the discharge paths causes deviation of the highly resistive regions. In this embodiment, the heating resistors and the highly resistive regions, however, do not overlap with each other, because the highly resistive regions are separated from the heating regions by electrodes. Accordingly, there is no damage to the heating resistors.

According to this embodiment, resistors between respective pairs of electrodes are simultaneously processed to form high resistance, so that the time required for forming high resistance is greatly reduced. Further, the resistors between the respective pairs of electrodes having no effect on heating are processed, so that there is no damage of the heating resistors which are important for recording.

A further method of forming high resistance between a pair of electrodes is described. The connection between the electric power source and the pair of electrodes is the same as FIG. 18. Although the embodiment of FIG. 18 has shown the case where the connection between resistor particles is broken by electric discharge by application of electric field, this embodiment is characterized in that the connection between resistor particles is broken by self heating by current application thereby forming high resistance between the pair of electrodes.

Figure 20:
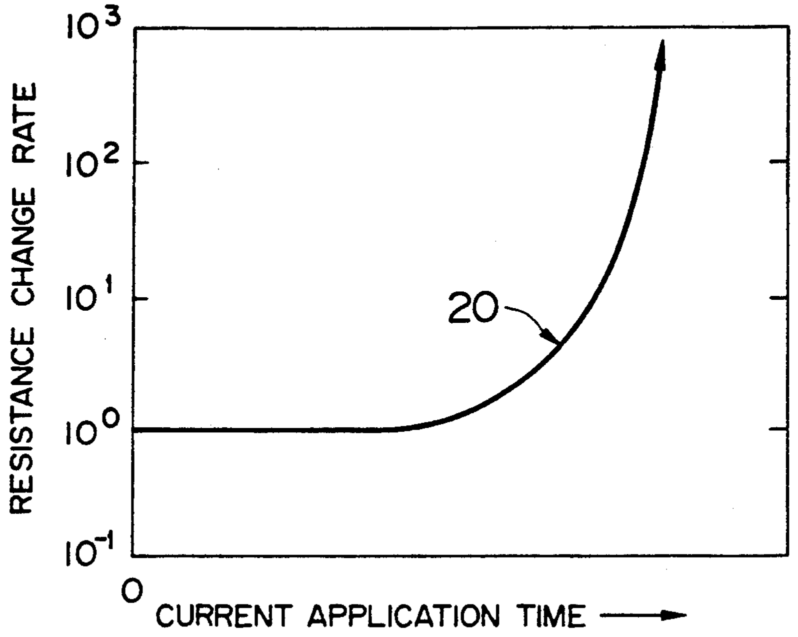

FIG. 20 shows the characteristic curve 20 of resistance change rate 18 vs. current application time 40. By making the current application time 40 longer, the resistance change rate 18 increases rapidly and reaches a high resistance state.

According to this embodiment, the process for forming highly resistive region is conducted by using a low voltage DC or AC electric power source, so that the thermal head of the invention is produced by a low-cost apparatus.

Figure 21A:
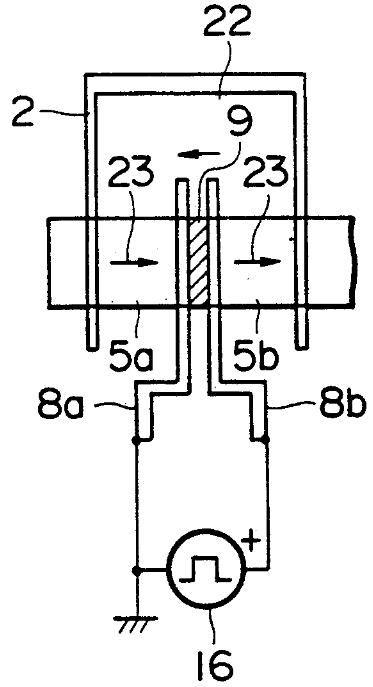
FIGS. 21A and 21B are diagrams showing further embodiments of the present invention.
Figure 21B:
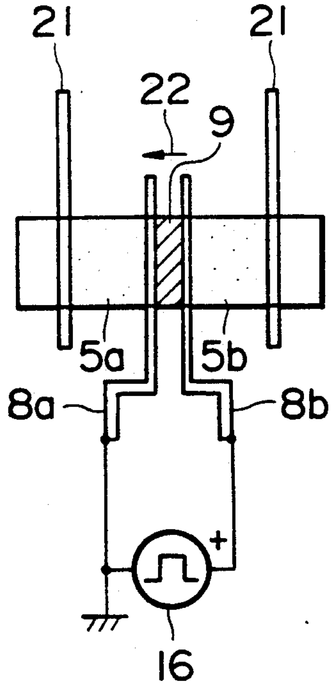
Figure 22:
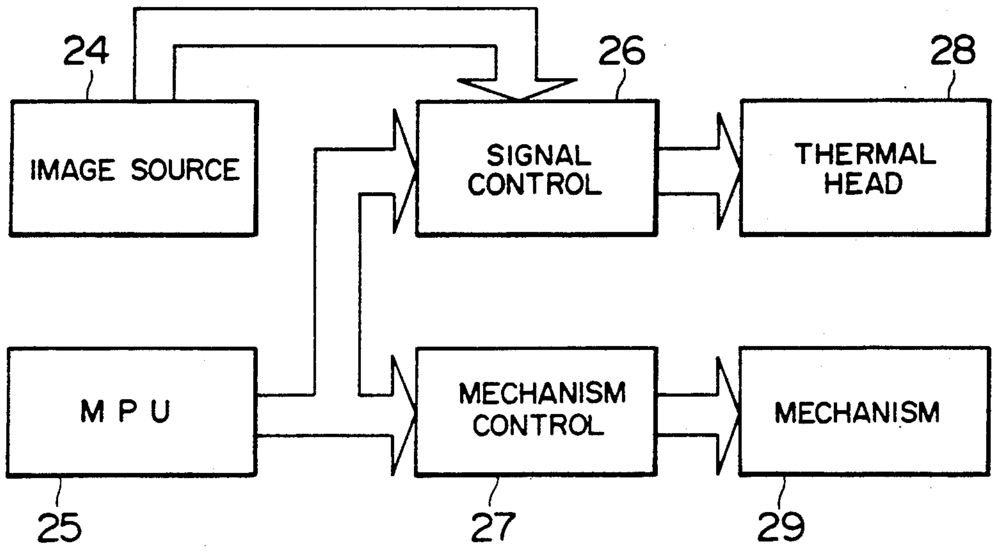
FIG. 22 PRIOR ART
FIGS. 22 and 23 are diagrams showing a recording apparatus using the thermal head according to the present invention.
Figure 23:
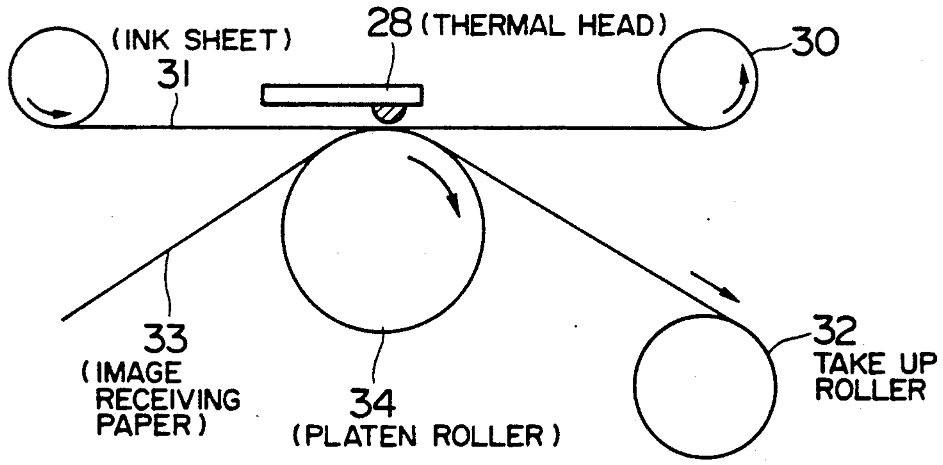
FIG. 23 PRIOR ART
Figure 24:
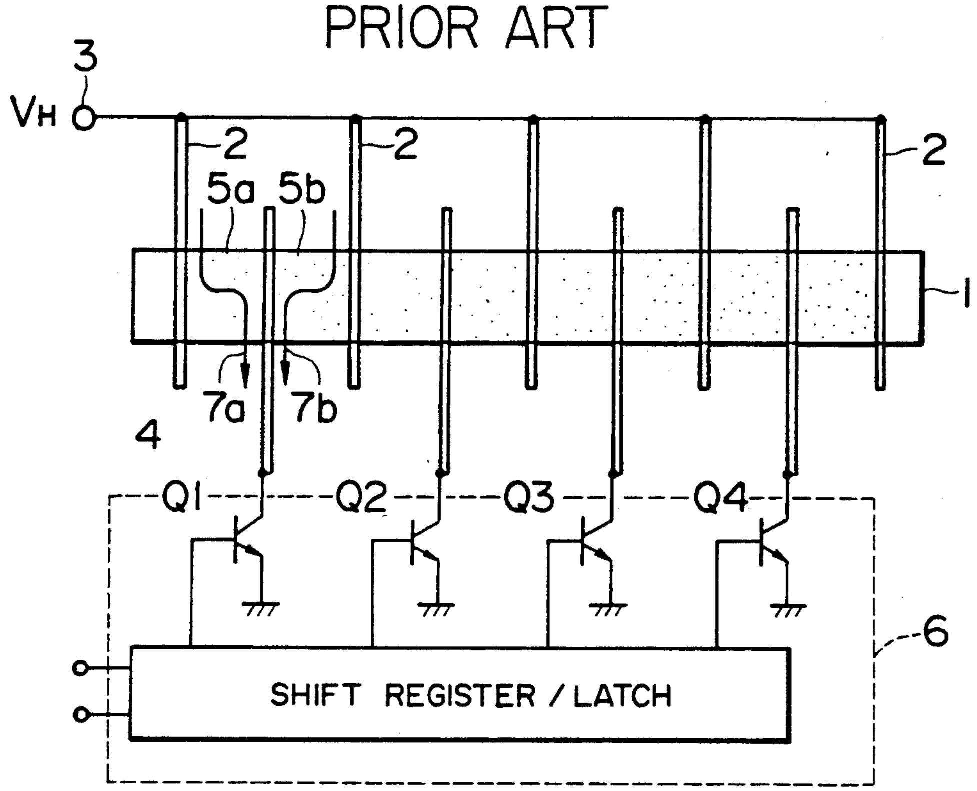
F I G. 24 PRIOR ART
FIGS. 24 and 25 are diagrams showing a conventional thermal head.
Figure 25:
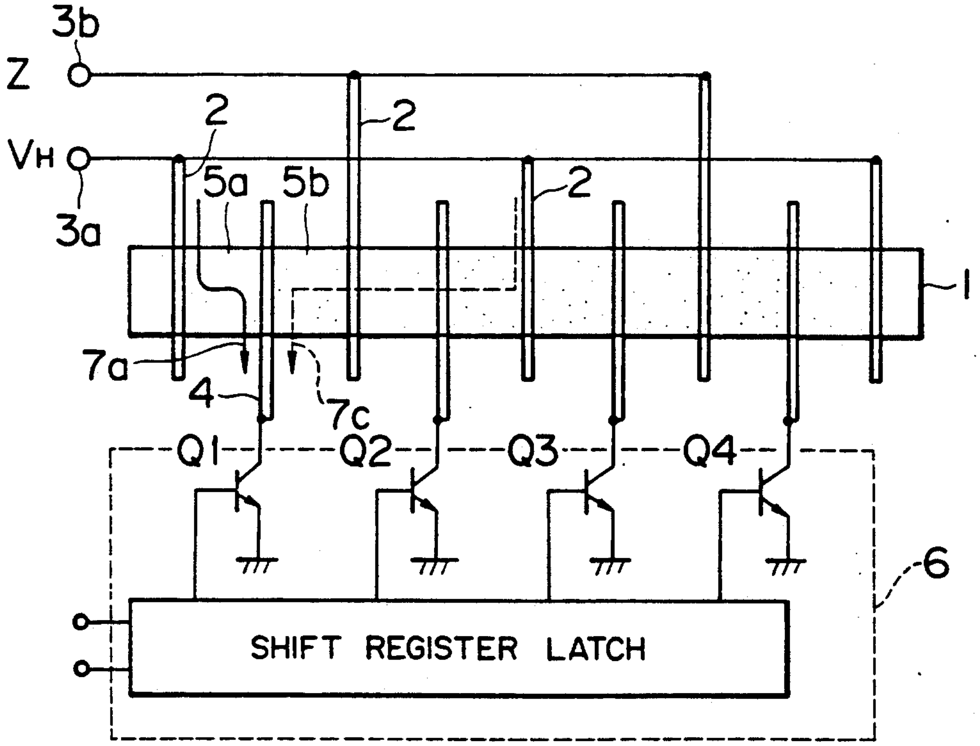
F I G. 25 PRIOR ART

FIGS. 21A and 21B show varieties of method of forming high resistance between a pair of electrodes in the arrangement in which common electrodes are provided between adjacent two electrodes as shown in FIGS. 1, 3, 5, 6 and 8.

When a voltage is applied between the pair of electrodes as shown in FIG. 21A in the process of making highly resistive region with the common electrode, being connected together, a current 23 is applied through the individual electrode 8*b*, heating resistor 5*b*, individual electrode 2, heating resistor 5*a* and common electrode 8*a* as well as through the highly resistive region 9. As the result, the heating resistor may be damaged. Accordingly, in this process, the highly resistive region is formed while disconnecting the common electrodes 21 as shown in FIG. 21B. Thereafter, the common electrodes are connected to each other. By such construction, the common electrodes 21 remained in a floating state during the process of making the highly resistive region. Accordingly, there is no occurrence of unnecessary voltage application and current application.

According to this embodiment, there is no occurrence of unnecessary voltage application and current application at the process of making the highly resistive region. Consequently, the process for making the highly resistive region is carried out with no damage of the heating resistor.

The embodiments of the present invention as shown in FIGS. 1 through 10 are characterized in that required resistors are changed to high resistance to thereby make it possible to form one picture element by one dot. On the contrary, in the conventional thermal head, one picture element is formed by two dots disposed in parallel. Accordingly, in the process of producing the conventional thermal head, it is impossible to measure the resistance value of the resistor pair and accordingly it is impossible to correct the resistance value of the resistors corresponding to one dot.

In the thermal head of the present invention, one picture element is, however, formed by one dot. Accordingly, correction of the resistance value of the resistor is carried out during the process for producing the head by using a characteristic by which the resistance value is changed by voltage pulse application. Further, in the recording apparatus using the aforementioned thermal head, the variation in heating characteristic caused by the variation in the resistance value can be corrected electrically and accurately by controlling the width of the pulses as applied or the like.

The thermal head according to the present invention is capable of super-fine recording and halftone recording by arrangement such that one picture element is formed by one heating resistor; the heating resistor is made with high-accurate pattern forming because the form of the heating resistor is determined by etching process; and the recording dot area is controlled by control of the applied energy to the heating resistor if a current concentrating portion is provided to the heating resistor. Accordingly, the thermal head is obtained by a thick-film process adapted to provide the above arrangement.

Further, multi-tone recording, correction of the total resistance value of resistors forming one picture element, and control of the temperature variation of the resistors are realized by controlling the density of the current flowing in the resistors corresponding to one picture element by a plurality of switching devices. Accordingly, a thermal head capable of high-accurate heating control and a method of controlling the head are attained.

Furthermore, in the thermal head producing method of the invention, high resistance is formed between every pair of electrodes without carrying out unnecessary voltage application and current application to the heating resistor. Accordingly, a thermal head capable of high-accurate heating control is produced easily by the thick-film process.

In addition, the recording apparatus using the thermal head according to the invention is provided so that one heating resistor is controlled by the respective individual electrode. Accordingly, the variation in recording density of the respective recording picture element caused by variation of the resistance value is corrected electrically and accurately.

What is claimed is:

1. A thermal head comprising:
   - a plurality of heating resistor portions disposed on an insulating substrate with spaces between every adjacent two of said resistor portions;
   - a first group of electrodes disposed at a first subset of said spaces and supplying currents to said heating resistor portions through end portions of said heating resistor portions;
   - a second group of electrodes disposed at a second subset of said spaces and discharging currents, after passing said heating resistor portions, out of said heating resistor portions through other end portions of said heating resistor portions; and
   - highly resistive regions each disposed between adjacent two of said highly resistor portions and having a higher electric resistance than that of each of said heating resistor portions.

2. A thermal head according to claim 1, in which an even number of the heating resistor portions are interposed between two of said highly resistive regions.

3. A thermal head according to claim 2, in which the number of said heating resistor portions is two.

4. A thermal head according to claim 2, in which the number of said heating resistor portions is four.

5. A thermal head according to claim 1, in which each of said heating resistor portions has a portion where current density is concentrated.

6. A thermal head according to claim 1, in which the width of the respective heating resistor portion determined by the distance between adjacent two of said first and second groups of electrodes is different from the width of the highly resistive region.

7. A thermal head according to claim 1, in which the width of the respective highly resistive region is less than the width of the respective heating resistor portion.

8. A thermal head according to claim 1, in which energy per unit area in each of the highly resistive regions exhibited when energy of a given potential is applied thereto is less than that in each of the heating resistor portions exhibited when energy of the same potential is applied thereto.

9. A thermal head comprising:
   - a plurality of heating resistor portions disposed on an insulating substrate;
   - a first group of electrodes supplying currents to said heating resistor portions through end portions of said heating resistor portions;
   - a second group of electrodes discharging said current, after passing said heating resistor portions, out of said heating resistor portions through other end portions of said heating resistor portions; and highly resistive regions each disposed between adjacent two of said highly resistor portions and having a higher electric resistance than that of each of said heating resistor portions;

wherein said first and second groups of electrodes overlap with each other so that said highly resistive regions are disposed between said first and second groups of electrodes.

10. A thermal head comprising:

a plurality of heating resistor portions disposed on an insulating substrate with spaces between every adjacent two of said resistor portions, each of said resistor portions being divided into two areas;

a first group of electrodes, each disposed between the two areas of one of said heating resistor portions, supplying currents to said heating resistor portions, respectively, such that each of the first group of electrodes is adapted to apply current to the two areas of one of said heating resistor portions;

a second group of electrodes disposed at the spaces on said insulating substrate, discharging said currents, after passing said heating resistor portions, such that the current applied to each of the areas of one of said heating resistor portions is discharged through one of said second group of electrodes; and highly resistive regions each disposed between adjacent two of said heating resistor portions and having higher electric resistance than that of each of said heating resistor portions.

11. A thermal head comprising:

a plurality of heating resistor portions disposed on an insulating substrate with spaces between every adjacent two of said resistor portions;

a first group of electrodes disposed at a first subset of said spaces and applying currents to said heating resistor portions through end portions of said heating resistor portions;

a second group of electrodes disposed at a second subset of said spaces and discharging said currents, after passing said heating resistor portions, out of said heating resistor portions through other end portions of said heating resistor portions;

highly resistive regions each disposed between adjacent two of said heating resistor portions and having higher electric resistance than that of each of said heating resistor portions;

switching elements connected to said second group of electrodes; and a circuit for controlling the opening/closing of said switching elements.

12. A thermal head comprising:

a plurality of heating resistor portions disposed on an insulating substrate with spaces between every adjacent two of said resistor portions, each of said resistor portions being divided into two areas;

a first group of electrodes, each disposed between the two areas of one of said heating resistor portions on said insulating substrate and applying currents to said heating resistor portions, respectively, such that each of the first group electrodes is adapted to apply currents to the two areas of one of said heating resistor portions;

a second group of electrodes disposed at the spaces on said insulating substrate and discharging said currents, after passing said heating resistor portions, such that the current applied to each of the areas of one of said heating resistor portions is discharged through one of said second group electrodes;

highly resistive regions each disposed between adjacent two of said heating resistor portions and having higher electric resistance than that of each of said heating resistor portions;

switching elements connected to said second group of electrodes; and a circuit for controlling the opening/closing of said switching elements.

13. A thermal head comprising:

a plurality of picture element portions made of heating resistor portions disposed on an insulating substrate with spaces between every adjacent two of said picture element portions;

a first group of electrodes disposed at a first subset of the spaces on said insulating substrate and applying currents to said picture element portions through end portions of said picture element portions;

a second group of electrodes disposed at a second subset of the spaces on said insulating substrate and discharging said currents, after passing said picture element portions, out of said picture element portions through other end portions of said heating resistor portions; and highly resistive regions each disposed between adjacent two of said heating resistor portions and having a higher resistance than that of each of said heating resistor portions.

14. A thermal according to claim 13, in which distances, each measured between heating centers of adjacent picture element portions, are equal to each other when maximum temperature portions at heating of said picture element portions are defined as said heating centers.

15. A thermal according to claim 13, in which each of said picture element portions is formed symmetrically with respect to its center line extending between the first and second group electrodes adjacent to the picture element portion.

16. A thermal according to claim 13, in which each of said picture element portions is formed asymmetrically with respect to its center line extending between the first and second group electrodes adjacent to the picture element portion.

17. A thermal according to claim 13, in which a plurality of switching devices are provided to switch signal supply path to said first group of electrodes to thereby control the current supply into said picture element portions.

18. A thermal according to claim 17, in which at least two of said switching devices are connected to the ground potential and further respectively connected to different electrodes of the second group.

19. A thermal according to claim 17, in which at least one of said switching devices has one end connected to a fixed potential and the other end connected to one of said second group electrodes.

20. A thermal head comprising:

a plurality of picture element portions made of heating resistor portions disposed on an insulating substrate;

a first group of electrodes applying currents to said picture element portions through end portions of said picture element portions;

a second group of electrodes for discharging said currents, after passing said picture element portions, out of said picture element portions;

highly resistive regions each disposed between adjacent two of said highly resistor portions and having a higher electric resistance than that of each of said heating resistor portions; and a plurality of switching devices provided to switch signal supply path to said first group of electrodes to thereby control the current supply into said picture element portions;

wherein the width of at lest one said picture elements portions in the direction of arrangement of said picture element portions is different from that of the others.

21. A thermal head comprising:

a plurality of picture element portions made of heating resistor portions disposed on an insulating substrate with spaces between every adjacent two of said picture element portions, each of said picture element portions being divided into two areas;

a first group of electrodes, each disposed between the two areas of one of said picture element portions on said insulating substrate and applying currents to said picture element portions, such that each of the first group electrodes is adapted to apply currents to the two areas of one of said picture element portions;

a second group of electrodes disposed at the spaces on said insulating substrate and discharging said currents, after passing said picture element portions, such that the current applied to each of the areas of one of said picture element portions is discharged through one of said second group electrodes; and highly resistive regions each disposed between adjacent two of said highly resistor portions and having higher electric resistance than that of each of said heating resistor portions.

22. A thermal head comprising:

a plurality of picture element portions made of heating resistor portions disposed on an insulating substrate with spaces between every adjacent two of said picture element portions;

a first group of electrodes disposed at a first subset of the spaces on said insulating substrate and applying currents to said picture element portions through end portions of said picture element portions;

a second group of electrodes disposed at a second subset of the spaces on said insulating substrate and discharging said currents, after passing said picture element portions, out of said picture element portions through other end portions of said heating resistor portions;

highly resistive regions each disposed between adjacent two of said heating resistor portions and having a higher resistance than that of each of said heating resistor portions;

switching elements connected to said second group of electrodes; and a circuit for controlling the opening/closing of said switching elements.

23. A thermal head comprising:

a plurality of picture element portions made of heating resistor portions disposed on an insulating substrate with spaces between every adjacent two of said picture element portions, each of said picture element portions being divided into two areas;

a first group of electrodes, each disposed between the two areas of one of said picture element portions on said insulating substrate and applying currents to said picture element portions, such that each of the first group electrodes is adapted to apply currents to the two areas of one of said picture element portions;

a second group of electrodes disposed at the spaces on said insulating substrate and discharging said currents, after passing said picture element portions, such that the current applied to each of the areas of one of said picture element portions is discharged through one of said second group electrode;

highly resistive regions each disposed between adjacent two of said highly resistor portions and having higher electric resistance than that of each of said heating resistor portions;

switching elements connected to said second group of electrodes; and a circuit for controlling the opening/closing of said switching elements.

24. A recording apparatus comprising:

a picture signal generating source for printing a picture on a recording medium;

a control signal generating portion for generating a control signal to perform said printing;

a signal control portion for processing signals received from said picture signal generating source and said control signal generating portion;

a mechanism control portion for controlling a mechanism for performing said printing on the basis of said control signal received from said control signal generating portion;

a thermal head for producing heating points corresponding to a picture pattern on a basis of said signal received from said signal control portion, said thermal head comprising:

- a plurality of heating resistor portions disposed on an insulating substrate with spaces between every adjacent two of said resistor portions;
- a first group of electrodes disposed at a first subset of said spaces and supplying currents to said heating resistor portions through end portions of said heating resistor portions;
- a second group of electrodes disposed at a second subset of said spaces and discharging said currents, after passing said heating resistor portions, out of said heating resistor portions through other end portions of said heating resistor portions; and
- highly resistive regions each disposed between adjacent two of said heating resistor portions and having a higher electric resistance than that of each of said heating resistor portions.

a recording member for acting on said recording medium through transmission of heat from said heating points; and a mechanism portion for relatively moving said recording medium, said thermal head and said recording member.

25. A thermal head comprising:

a plurality of heating resistor portions disposed on an insulating substrate with spaces between every adjacent two of said resistor portions and each having an upper surface remote from the insulating substrate, a lower surface adjacent to the insulating substrate and first and second end portions facing to the adjacent ones of the spaces;

a first group of electrodes disposed at the spaces so as to be in electrical contact with the upper surfaces of the heating resistor portions at the respective first end portions thereof, respectively, for applying currents to said heating resistor portions through the upper surfaces of said heating resistor portions;

a second group of electrodes disposed at the spaces so as to be in electrical contact with lower surfaces of the heating resistor portions at the respective second end portions thereof, respectively, for discharging said currents, after passing said heating resistor portions, out of said heating resistor portions through the lower surfaces of said heating resistor portions; and highly resistive regions formed in the spaces, each having a higher resistance than that of each of said heating resistor portions.

26. A thermal head comprising:

a plurality of heating resistor portions disposed on an insulating substrate with spaces between every adjacent two of said resistor portions and each having an upper surface remote from the insulating substrate and a lower surface adjacent to the insulating substrate;

highly resistive regions formed in the spaces, each having a higher resistance than that of each of said heating resistor portions;

a first group of electrodes disposed over the highly resistive portions, respectively, so as to be in electrical contact with the upper surfaces of the heating resistor portions, respectively, for applying currents to said heating resistor portions through the upper surfaces of said heating resistor portions; and a second group of electrodes disposed below the highly resistive portions, respectively, so as to be in electrical contact with lower surfaces of the heating resistor portions, respectively, for discharging said currents, after passing said heating resistor portions, out of said heating resistor portions through the lower surfaces of said heating resistor portions.

* * * * *

UNITED STATES PATENT AND TRADEMARK OFFICE
CERTIFICATE OF CORRECTION

PATENT NO. :5,097,272

DATED :March 17, 1992

INVENTOR(S) :Makoto Tsumura, et al

It is certified that error appears in the above-indentified patent and that said Letters Patent is hereby corrected as shown below:

| Column | Line | |
|---|---|---|
| 1 | 17 | Change "ar" to --are--. |
| 3 | 30 | Change "be not" to --not be--. |
| 3 | 51 | Change "embodiment" to --embodiments--. |
| 4 | 23 | Delete entire line. |
| 5 | 16 | After "resistor" insert --so--. |
| 5 | 38 | Change "characterisitic" to --characteristics--. |
| 7 | 43 | Change "resistor" to --resistive--. |
| 7 | 62 | Change "the portion" to --an--. |
| 9 | 5 | Change "so" to --such--. |
| 9 | 35 | Change "are" to --area--. |
| 9 | 51 | Change "correspondingly" to --corresponding-- |
| 9 | 60 | Change "centers" to --center--. |
| 10 | 3 | Change "2d" to --2b--; change "8d" to --8b--. |
| 10 | 38-39 | Do not start new paragraph. |
| 10 | 60-62 | Do not boldface. |

UNITED STATES PATENT AND TRADEMARK OFFICE

CERTIFICATE OF CORRECTION

PATENT NO. : 5,097,272

DATED : March 17, 1992

INVENTOR(S) : Makoto Tsumura, et al

It is certified that error appears in the above-indentified patent and that said Letters Patent is hereby corrected as shown below:

| Column | Line | |
|---|---|---|
| 11 | 12 | After "embodiment," insert --there is--. |
| 11 | 27 | Change "attributing" to --due--. |
| 11 | 29 | Change "attributing to" to --resulting from-- |
| 11 | 47 | Change "capably" to --capable--. |
| 12 | 29 | Change "resulted" to --resulting--. |
| 15 | 29 | Before "high" insert --a--. |
| 15 | 45 | Before "high" insert --a--. |
| 15 | 47 | After "ing" insert --the--; before "resistance" insert --high--. |
| 15 | 51 | Before "highly" insert --a--. |
| 15 | 62 | After "by" insert --the--. |
| 16 | 65 | After "ing" insert --the--. |
| 17 | 4 | After "between" insert --two--; after "adjacent" delete "two". |
| 17 | 8 | Change "electrode," to --electrodes--. |
| 17 | 11 | Change "common" to --individual--. |
| 17 | 18 | Change "remained" to --remain--. |
| 17 | 25 | Change "at" to --with--. |

UNITED STATES PATENT AND TRADEMARK OFFICE

CERTIFICATE OF CORRECTION

PATENT NO. : 5,097,272

DATED : March 17, 1992

INVENTOR(S) : Makoto Tsumura, et al

It is certified that error appears in the above-indentified patent and that said Letters Patent is hereby corrected as shown below:

| Column | Line | |
|---|---|---|
| 18 | 33 | Before "resistor" change "highly" to --heating--. |
| 19 | 4 | Before "resistor" change "highly" to --heating--. |
| 19 | 18 | Change "supplying" to --applying--. |
| 20 | 33 | After "thermal" insert --head--. |
| 20 | 39 | After "thermal" insert --head--. |
| 20 | 44 | After "thermal" insert --head--. |
| 20 | 49 | After "thermal" insert --head--. |
| 20 | 58 | After "thermal" insert --head--. |
| 21 | 5 | Change "highly" to --heating--. |
| 21 | 12 | Change "lest one" to --least one of--; change "elements" to --element--. |

UNITED STATES PATENT AND TRADEMARK OFFICE

CERTIFICATE OF CORRECTION

PATENT NO. :5,097,272

DATED :March 17, 1992

INVENTOR(S) :Makoto Tsumura, et al

It is certified that error appears in the above-indentified patent and that said Letters Patent is hereby corrected as shown below:

| Column | Line | |
|---|---|---|
| 21 | 37 | Change "highly" to --heating--. |
| 22 | 13 | After "group" insert --of--. |
| 22 | 14 | Change "trode;" to --trodes;--. |
| 22 | 20 | After "and" start a new paragraph. |

Signed and Sealed this

Twelfth Day of October, 1993

Attest:

BRUCE LEHMAN

*Attesting Officer*

*Commissioner of Patents and Trademarks*